United States Patent
Brewer et al.

(10) Patent No.: US 6,285,361 B1
(45) Date of Patent: Sep. 4, 2001

(54) METHOD AND APPARATUS FOR CLIPPING VIDEO SEGMENTS FROM AN AUDIOVISUAL FILE

(75) Inventors: Eric T. Brewer, Saratoga; Andrew Palfreyman, Sunnyvale, both of CA (US); Thomas S. Gilley, Lamoine, ME (US)

(73) Assignee: FutureTel, Inc., Sunnyvale, CA (US)

( * ) Notice: Subject to any disclaimer, the term of this patent is extended or adjusted under 35 U.S.C. 154(b) by 0 days.

(21) Appl. No.: 08/948,352

(22) Filed: Oct. 9, 1997

Related U.S. Application Data
(60) Provisional application No. 60/044,383, filed on Nov. 15, 1996.

(51) Int. Cl.[7] .................................................. G06F 3/00
(52) U.S. Cl. ......................... 345/328; 386/52; 386/109; 348/575
(58) Field of Search ..................... 348/441, 442, 348/443, 444, 445, 446, 448, 575, 384, 400, 401, 402, 409, 415, 394, 395; 345/328, 302, 440, 473; 707/10, 102, 104, 1; 386/109, 52, 111, 64, 112, 27; G06F 3/00

(56) References Cited

U.S. PATENT DOCUMENTS

| 5,818,537 | * | 10/1998 | Enokida et al. ..................... 348/441 |
| 5,841,942 | * | 11/1998 | Sugiyama ............................. 386/109 |
| 6,012,091 | * | 1/2000 | Boyce ..................................... 348/7 |
| 6,026,389 | * | 2/2000 | Nakajima et al. .................. 345/328 |

* cited by examiner

Primary Examiner—Michael Lee
(74) Attorney, Agent, or Firm—Beyer Weaver & Thomas, LLP

(57) ABSTRACT

Disclosed is a method for clipping a segment from a video file having a multiplicity of video frames. Preferably, at least some of the frames in the video file are encoded as predicted frames. The method includes selecting a mark-in location in the video file that defines the beginning of the clipped segment. A mark-out location defining the end of the clipped segment is also selected in the video file. Once the mark-in and mark-out locations are selected, the method decodes a first frame associated with one of the mark-in location and the mark-out location. The first frame is preferably a predictive frame that has an associated first format. The first frame is then re-encoded into a second format and stored. The method then proceeds to create a clipped segment that includes the re-encoded first frame.

30 Claims, 15 Drawing Sheets

METHOD AND APPARATUS FOR CLIPPING VIDEO SEGMENTS FROM AN AUDIOVISUAL FILE

This application claims the benefit of U.S. Provisional Application No. 60/044,383 filed on Nov. 15, 1996, the disclosure of which is incorporated herein by reference.

CROSS REFERENCE TO RELATED APPLICATIONS

This application claims the benefit of U.S. Provisional Application No. 60/046,821 filed on Nov. 15, 1996, the disclosure of which is incorporated herein by reference.

This application is related to the following U.S. patent applications: (1) U.S. patent application Ser. No. 08/947,771 filed on the same day as the instant application, naming Eric T. Brewer, Andrew Palfreyman and Thomas S. Gilley as inventors, and entitled "METHOD AND APPARATUS FOR EDITING VIDEO FILES"; (2) U.S. patent application Ser. No. 08/948,380 filed on the same day as the instant application, naming Eric T. Brewer, Andrew Palfreyman and Greg C. Ames as inventors, and entitled "METHOD AND APPARATUS FOR SYNCHRONIZING EDITED AUDIOVISUAL FILES"; (3) U.S. patent application Ser. No. 08/947,646 filed on the same day as the application, naming Eric T. Brewer and Andrew Palfreyman as inventors, and entitled "METHOD AND APPARATUS FOR SEEKING WITHIN AUDIOVISUAL FILES"; (4) U.S. patent application Ser. No. 08/948,350 filed on the same day as the instant application, naming Eric T. Brewer, Andrew Palfreyman, and Thomas S. Gilley as inventors, and entitled "METHOD AND APPARATUS FOR STITCHING EDITED VIDEO SEGMENTS"; and (5) U.S. patent application Ser. No. 08/947,844 filed on the same day as the instant application, naming Eric T. Brewer, Andrew Palfreyman and Greg C. Ames as inventors, and entitled "METHOD AND APPARATUS FOR COPYING AN AUDIOVISUAL SEGMENT." All above identified applications are hereby incorporated by reference.

BACKGROUND OF THE INVENTION

1. Field of the Invention

The present invention relates generally to methods for editing video files. More particularly, the invention relates to various methods and apparatuses for processing video frames and video segments to facilitate editing. In one aspect, methods and apparatuses for copying a segment of video from an input data stream and processing the copied segment to be independent of information contained in the original input data stream are disclosed.

2. Description of the Related Art

MPEG (motion pictures experts group) is a standard promulgated by the International Standards Organization (ISO) to provide a syntax for compactly representing digital video and audio signals. The syntax generally requires that a minimum number of rules be followed when bit streams are encoded so that a receiver of the encoded bit stream may unambiguously decode the received bit stream. As is well known to those skilled in the art, a bit stream will also include a "system" component in addition to the video and audio components. Generally speaking, the system component contains information required for combining and synchronizing each of the video and audio components into a single bit stream. Specifically, the system component allows audio/video synchronization to be realized at the decoder.

Since the initial unveiling of the first MPEG standard entitled MPEG-1, a second MPEG standard known as MPEG-2 was introduced. In general, MPEG-2 provided an improved syntax to enable a more efficient representation of broadcast video. By way of background, MPEG-1 was optimized to handle data at a rate of 1.5 Mbits/second and reconstruct about 30 video frames per second, with each frame having a resolution of 352 pixels by 240 lines (NTSC), or about 25 video frames per second, each frame having a resolution of 352 pixels by 288 lines (PAL). Therefore, decoded MPEG-1 video generally approximates the perceptual quality of consumer video tapes (VHS). In comparison, MPEG-2 is designed to represent CCIR 601-resolution video at data rates of 4.0 to 8.0 Mbits/second and provide a frame resolution of 720 pixels by 480 lines (NTSC), or 720 pixels by 576 lines (PAL). For simplicity, except where distinctions between the two versions of the MPEG standard exist, the term "MPEG," will be used to reference video and audio encoding and decoding algorithms promulgated in current as well as future versions.

Typically, a decoding process begins when an MPEG bit stream containing video, audio and system information is demultiplexed by a system decoder that is responsible for producing separate encoded video and audio bit streams that may subsequently be decoded by a video decoder and an audio decoder. Attention is now directed at the structure of an encoded video bit stream. Generally, an encoded MPEG video bit stream is organized in a distinguishable data structure hierarchy. At the highest level in the hierarchy is a "video sequence" which may include a sequence header, one or more groups of pictures (GOPs) and an end-of sequence code. GOPs are subsets of video sequences, and each GOP may include one or more pictures. As will be described below, GOPs are of particular importance because they allow access to a defined segment of a video sequence, although in certain cases, a GOP may be quite large.

Each picture within a GOP is then partitioned into several horizontal "slices" defined from left to right and top to bottom. The individual slices are in turn composed of one or more macroblocks which identify a square area of 16-by-16 pixels. As described in the MPEG standard, a macroblock includes four 8-by-8 pixel "luminance" components, and two 8-by-8 "chrominance" components (i.e., chroma red and chroma blue).

Because a large degree of pixel information is similar or identical between pictures within a GOP, the MPEG standard takes particular advantage of this temporal redundancy and represents selected pictures in terms of their differences from a particular reference picture. The MPEG standard defines three general types of encoded picture frames. The first type of frame is an intra-frame (I-frame). An I-frame is encoded using information contained in the frame itself and is not dependent on information contained in previous or future frames. As a result, an I-frame generally defines the starting point of a particular GOP in a sequence of frames.

A second type of frame is a predicted-frame (P-frame). P-frames are generally encoded using information contained in a previous I or P frame. As is well known in the art, P frames are known as forward predicted frames. The third type of frame is a bi-directional-frame (B-frame). B-frames are encoded based on information contained in both past and future frames, and are therefore known as bi-directionally predicted frames. Therefore, B-frames provide more compression that both I-frames and P-frames, and P-frames provide more compression than I-frames. Although the MPEG standard does not require that a particular number of B-frames be arranged between any I or P frames, most encoders select two B-frames between I and P frames. This design choice is based on factors such as amount of memory in the encoder and the characteristics and definition needed for the material being coded.

Although the MPEG standard defines a convenient syntax for compactly encoding video and audio bit stearns, significant difficulties arise when a segment of an encoded bit stream is clipped out for use in a new bit stream. In particular, because P-frames use information from previous frames in the bit stream, and B frames use information from both previous and future frames, clips must be performed at I-frames. That is, the clipped segment must have an 1-frame as a starting frame and a P or an I frame as the final frame in the clipped segment. Performing clips at I-frames therefore eliminates producing video clips that have beginning and ending frames which cannot be decoded without the reference frames contained in the original bit stream.

Unfortunately, typical encoded video bit streams have a larger number of P and B frames in between I-frames. Consequently, this disadvantageously limits the locations at which a clip may be performed, and therefore renders encoded MPEG bit streams unsuitable for the video editing industry which demands frame accurate precision.

In view of the forgoing, what is needed is a method and apparatus for editing video bit streams with frame accurate precision. In particular, there is a need for a method and apparatus for clipping segments in a video bit stream which allow beginning and ending clipped segments of video at any frame within the bit stream without losing the ability to decode frames in the clipped segment.

SUMMARY OF THE INVENTION

To achieve the foregoing in accordance with the purpose of the present invention, a method and apparatus for editing and copying a segment from a video file is disclosed. In one embodiment of this invention, the editing engine is used to clip (i.e., copy) segments of video from an MPEG bit stream file and processing portions of the clipped segment to generate a bit stream segment that is independent of information contained in the original bit stream file. Generally, the editing engine processes the clipped segment in two processing passes through an edit list provided by an application requesting a particular editing operation. In the first processing pass, the editing engine preferably generates glue segments for the clipped segment based on the type of frames located at the beginning and at the end of the clipped segment. In the second processing pass, any glue segments generated in the first pass may be stitched to any un-processed portion of the clipped segment. Once any glue segments and unprocessed portions are stitched in a time ordered sequence, the stitched segment is output to the application. Advantageously, the stitched segment will not require information contained in the original bit stream file in order to accurately decode video frames in the clipped segment.

In another embodiment, a method for clipping a segment from a video file having a multiplicity of video frames is disclosed. Preferably, at least some of the frames in the video file are encoded as predicted frames. The method includes selecting a mark-in location in the video file that defines the beginning of the clipped segment. A mark-out location defining the end of the clipped segment is also selected in the video file. Once the mark-in and mark-out locations are selected, the method decodes a first frame associated with one of the mark-in location and the mark-out location. The first frame is preferably a predictive frame that has an associated first format. The first frame is then re-encoded into a second format and stored. The method then proceeds to create a clipped segment that includes the re-encoded first frame.

In yet another embodiment, a method for copying a segment from a video file is disclosed. The method includes the steps of selecting a mark-in location in the video file such that the mark-in location defines the beginning of the copied segment. Once the mark-in location is selected, each of the frames positioned between the mark-in location and a final group frame associated with a group of frames that includes the mark-in location are decoded. Preferably, each decoded frame will have an associated first format. The decoded frames are then re-encoded into an associated second format such that the re-encoded second format of at least one of the decoded frames is different than its associated first format. The re-encoded frames are then stored. The method then generates a copied segment that includes at least the re-encoded frames.

Although the advantages are numerous, a particular advantage of this invention is that the generated copied video segment will not require information from the original input stream in order to decode video frames in the copied segment. Specifically, the copied segment will be a frame accurate segment that is an independently playable output stream. Further, the copied video segment may be joined with other copied segments to create new edited video streams. It should also be appreciated that the editing engine of this invention may process any type of editing request by creating an appropriate editing operator. Additionally, new editing operators may be installed by future applications requesting a particular editing operation.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Broadly speaking, the present invention discloses a method and apparatus for editing a video file through the use of an editing engine. In one embodiment of this invention, a method for clipping a segment of video from an MPEG bit stream file and processing portions of the clipped segment to generate a bit stream segment that is independent of information contained in the original bit stream file is disclosed. Generally, the editing engine processes the clipped segment to produce the independent segment in two processing passes through an edit list of operators provided by an application requesting a particular editing operation. In the first processing pass, the editing engine preferably generates glue segments for the clipped segment based on the type of frames located at the beginning and at the end of the clipped segment. In the second processing pass, any glue segments generated in the first pass are stitched to any un-processed portion of the clipped segment. Once any glue segments and unprocessed portions are stitched together in a correct time sequence, the stitched segment is sent to the application. Advantageously, the stitched segment will not require information contained in the original bit stream file in order to accurately decode the video frames.

Figure 1:
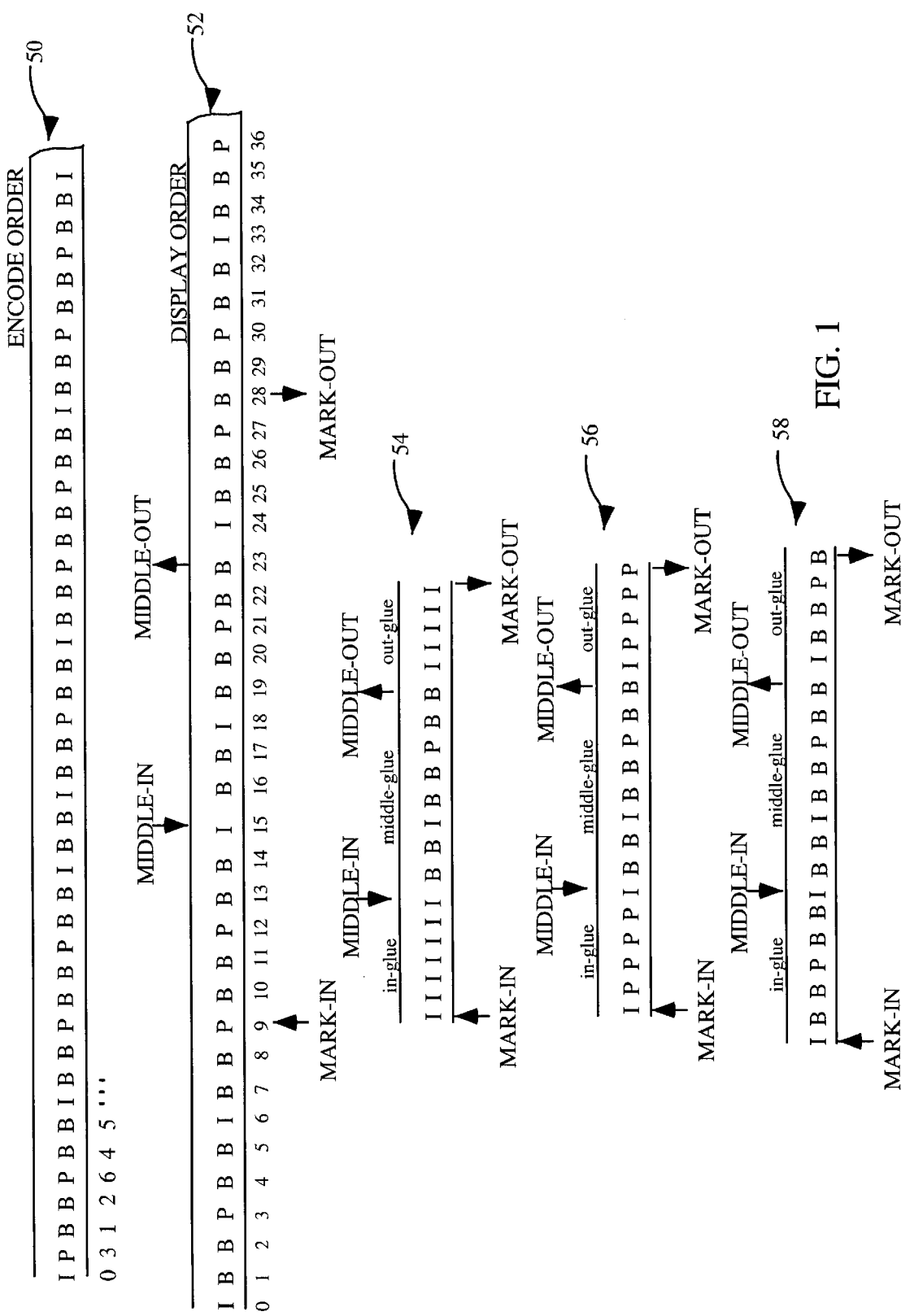
FIG. 1 shows a number of exemplary video frame sequences used to describe the processing steps associated editing video files in accordance with one embodiment of this invention.

FIG. 1 shows a number of exemplary video frame sequences used to describe the processing steps associated with generating video frame segments that are independent of frame information contained in a source file. An exemplary encode order stream 50 of video frames are presented to illustrate the order in which frames are encoded after being processed in accordance the MPEG standard format. By way of example, in encode order stream 50, the first frame is an I-frame which is followed by a P-frame, a B-frame, a B-frame, a P-frame, a B-frame, a B-frame, B-frame, etc. Although the editing algorithm of this invention may process a sequence of frames in any suitable arrangement, the editing algorithm of this invention preferably processes frame sequences in a display order.

Thus, a frame stream arranged in temporal order from frame 0 to 36 identifies the order in which frames are processed in a display order stream 52. For comparison, the corresponding temporal order of the frames in encode order stream 50 are illustrated under the corresponding frames. Of course, it should be understood that display order stream 52 is merely exemplary, and other suitable display order streams may also be suitably processed in accordance with the teachings of this invention.

When a segment of video frames is clipped from display order stream 52, a mark-in location and a mark-out location is selected to mark the number of frames being clipped. By way of example, a mark-in location is selected at frame 9 which is a P-frame, and a mark-out location is identified as frame 28 which is a B-frame. Accordingly, the segment of frames clipped from display order stream 52 will include frames 9 through 28. Once the size of the clip is determined, if frame 9 is not an I frame, and frame 28 is not an I frame or a P frame, frames at the beginning of the clip will require information from past frames in the case of P-frame 9, and past and future frames in the case of B-frame 28. Consequently, frames 9 through 14 and frames 25 through 28, being predictive-type frames, will be unable to be decoded without acquiring sufficient context from frames remaining in display order stream 52.

In order to make the entire clipped segment of video frames decodable, video frames 9 through 14 and 25 through 28 will be processed to make the entire clipped segment decodable and independent of information contained in the original display order stream 52. By way of example, a "draft mode" processed segment 54 is shown after frames 9 through 14 and 25 through 28 were decoded and re-encoded into I-frames. For convenience, processed frames 9 through 14 will be referred to as "in-glue segments," and frames 24 through 28 will be referred to as "out-glue segments." Further, un-processed frames 15 through 23 will be referred to as "middle-glue segments."

In this embodiment, the in-glue and out-glue segments have been encoded into I-frames which eliminates having frames within the clipped segment referencing frames earlier than frame 9, and B-frames 25, 26, and 28 will also not require information contained in frames past frame 28. It should be understood that the re-encoded in-glue and out-glue segments may also be encoded into I and P combinations, where an I-frame begins both the in-glue segment and the out-glue segment as shown in clipped "I-P mode" segment 56. In yet another embodiment, the re-encoded in-glue and out-glue segments may be coded into I-P-B frames, such that an I frame begins both the in-glue segment and the out-glue segment as shown in clipped "I-P-B mode" segment 58. If segment 58 is implemented, the distance (i.e., number of frames) between each of the P frames is preferably determined. Further, the GOP size of each of the above described modes should also preferably be determined.

As will be described below in greater detail, once a segment has been selected for clipping between a mark-in and a mark-out location, if the mark-in location is not already an I-frame, then the most previous I-frame from the mark-in location is identified. In this example, frame 6 is the most previous I-frame in display order stream 52. In this manner, an MPEG decoder may decode I-frame 6 to acquire sufficient context to decode and re-encode frames in the in-glue segment which includes mark-in frame 9 and extends to one frame before a middle-in frame 15. By way of example, once the decoder acquires context by decoding I-frame 6 into a pixel bitmap, the process will proceed to decode and re-encode frames 9, 10, 11, 12, 13, and 14. In a similar fashion, frames 25 through 28 will also be individually decoded and re-encoded since the decoder attained sufficient context from I frame 24. Therefore, frames 25, 26, 27, and 28 are also re-encoded to generate an appropriate out-glue segment which begins with I-frame 24.

Figure 2:
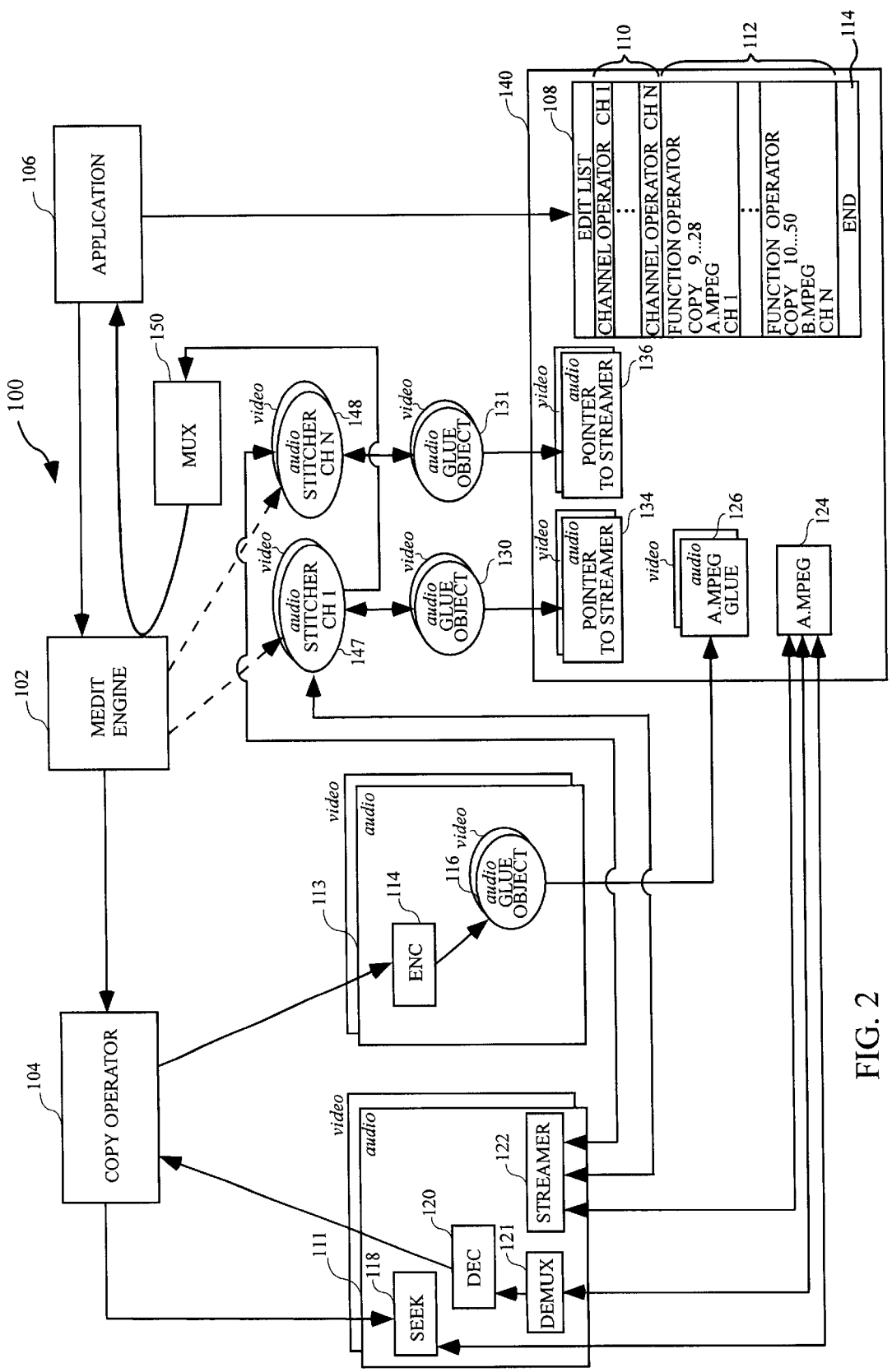
FIG. 2 is a data flow architecture used for editing video files in accordance with one embodiment of this invention.

FIG. 2 is a data flow architecture 100 used for editing a video file in accordance with one embodiment of this invention. As shown, a similar architecture (e.g., shown as shadowed objects) is used for editing the audio component of a file. A more detailed description of editing and synchronizing edited audiovisual files is provided in related U.S. patent applications: (1) Ser. No. 08/948,380 and (2) Ser. No. 08/947,844 which are hereby incorporated by reference.

In the embodiment shown, the data flow architecture 100 is preferably driven by an editing engine 102 (e.g., MEDIT editing engine) which is capable of performing a number of editing tasks. By way of example, such tasks may include copy operations requesting that a segment from a source or input stream file be copied for use in another file. Other suitable editing tasks may include fade operations, blend operations, morphing operations, titling operations, text annotation operations, etc. In general, MEDIT engine 102 is a dynamic engine that is capable of managing numerous editing tasks which may vary depending on the types of operators provided by an application requesting an editing task. It should therefore be understood that, MEDIT engine 102 may manage any number of operator types, including operators provided by future applications requesting sophisticated editing tasks.

As an overview, the following discussion will provide a general description of the processing steps taken by MEDIT engine 102 in performing editing tasks such as copying a segment of video from a source file. Generally, a copy operation is initiated when an application 106 requests that a copy operation be performed.

Initially, application 106 will provide MEDIT engine 102 with a suitable edit list 108 that includes a number of "channel operators" 110 identifying the number of channels requiring some type of editing, "function operators" 1 12 identifying the type of editing functions requested by application 106, and an "end operator" 114 identifying the end of an editing request. In the embodiment shown, the function operators 112 identify "copy" requests. By way of example, the first copy request identified in function operators 112 is a request for copying frames 9 through 28 in a file called A.MPEG for channel 1. As shown, there may be numerous other copy requests in function operators 112 leading up to a request for copying frames 10 through 25 in a file called B.MPEG for channel N.

Once MEDIT engine 102 receives edit list 108, the copy requests are processed in two identifiable passes through edit list 108. In a first pass, MEDIT engine 102 walks through edit list 108 identifying whether in-glue or out-glue segments are required for each copied segment. Of course, if both the mark-in and mark-out frames are I frames, then no in-glue or out-glue segments will be required. However, if either the mark-in frame is not an I frame, or the mark-out frame is not a P or an I frame, then glue segments will be generated for that copied segment. Once any glue segments are generated for the copied segments, the glue segments are stored in an appropriate storage medium 140. It should be understood that storage medium 140 may be any suitable storage medium such as a cache memory, a computer hard drive, floppy disk, or a remotely located storage medium connected by a suitable network.

In the second pass, the MEDIT engine 102 may make use of the previously generated glue segments by joining the glue portions with un-processed copied segments (i.e., middle glue) with the aid of a plurality of stitcher objects 147 and 148 that are created by MEDIT engine 102. As will be described in greater detail below, a stitcher object will be created for each channel in edit list 108, and each created stitcher object associated with a particular channel will be responsible for walking through edit list 108 and joining glue segments for its own channel (e.g., ignoring information associated with other channels).

In this manner, multiple stitcher objects may be created for each channel identified in edit list 108. In a preferred embodiment, each stitcher will be responsible for joining the particular glue segments in a proper time ordered manner, such that each generated segment is time stamped to generate an appropriate display order stream. Further, each created stitcher object uses a glue object such as glue objects 130 and 131 to pull the glue segments from the previously generated in-glue or out-glue files, or retrieve the middle glue from the original file by using pointers which identify the location of the middle-glue segment. By way of example, FIG. 1 shows an exemplary middle-glue segment that preferably includes frames 15 through 23. Once the stitched frame data is output as a program elementary stream (PES) to a multiplexer 150, the multiplexer 150 will pull PES data from all of the created stitchers and output the copied segments to application 106 through MEDIT 102.

To illustrate the overall data flow of FIG. 2, assume application 106 requests a copy operation of frames 9 through 28 from A.MPEG file 124 (i.e., display order stream 52 of FIG. 1) from channel 1. As MEDIT engine 102 walks through edit list 108 during a first pass, MEDIT engine 102 determines whether glue segments have already been generated and stored in a glue file during a previous editing request. Assuming that no glue segments already exist for a copy operation of frames 9 through 28 from A.MPEG file 124, MEDIT engine 102 will create copy operator 104 which creates a control object 111 (e.g., direct-in object).

In this embodiment, control object 111 uses a seek engine 118 to locate the appropriate frames identified for copying in A.MPEG file 124. For a more detailed description of suitable seeking engines, reference may be made to a related U.S. patent application Ser. No. 08/947,646, which is hereby incorporated by reference. Once the appropriate frames are located, a decoder will decode the most previous I-frame 6 to provide a decoder 120 with appropriate context for processing the frames within the in-glue segment. Once the decoder 120 has achieved an appropriate context, frame 9 is decoded by decoder 120 and transformed into a pixel bitmap which is sent to copy operator 104.

It should be understood that a decoder buffer used should be sufficiently managed to satisfy decoding requirements defined in the MPEG standard. In particular, constant rate coded bit streams should meet constraints imposed by a video buffering verifier (VBV). A VBV is defined in clause 2-C.1 of 2-Annex C (normative) of "Coding of Moving Pictures and Associated Audio, For Digital Storage Media At up to About 1.5 Mbit/s," 2-11172 (rev 1), which is hereby incorporated by reference.

Copy operator 104 then sends the bitmap information to a control object 113 (e.g., direct-out object) created by copy operator 104 and having an encoder 114. Encoder 114 then calls a glue object 116 which stores re-encoded frames into an A.MPEG glue file 126. As shown, A.MPEG glue file 126 is stored in storage medium 140 which may be cache memory. Once frame 9 is re-encoded into an I-frame, frames 10 through 14 will be re-encoded as in a like manner in order to generate a "glue-in" file such as A.MPEG glue file 126.

It should be appreciated, that MEDIT engine 102 will generally create separate copy operators for each copy request in edit list 108. Therefore, the second copy operation request in the edit list (i.e., frames 10 through 50 from B.MPEG file, channel N) will be processed by a separate copy operator 104 which will in turn create a new control object 111 for its own seeking and decoding functions, and a new control object 113 for encoding and transferring the generated glue frames to another glue file that may be stored within storage medium 140.

In one embodiment, execution of each copy operator may be processed by multiple processing units in a parallel format which advantageously expedites any editing requests identified in edit list 108. Further, parallel processing is facilitated since there is no set evaluation order in the edit list, and each editing operation may be performed independently of each other. In a further embodiment, multiple processing may be accomplished through the use of internet video servers. As is well known in the art, internet video servers may be used to simultaneously process editing requests in edit list 108.

Referring still to FIG. 2, once appropriate glue files are generated for each copy request in edit list 108, MEDIT engine 102 will walk through edit list 108 in a second pass to create stitcher objects such as stitcher objects 147 and 148 for each channel identified in edit list 108. Although only two stitcher objects are shown created for channel 1 and channel N, it should be understood that there may be any number of stitcher objects created depending on the number of channels identified in edit list 108. By way of example, in some embodiments, edit list 108 may contain stitcher objects for multiple channels up to about 4,000 video channels and about 8,000 audio channels under an MPEG-2 platform.

Once a stitcher object is created for each channel, each stitcher object 147 and 148 will preferably create glue objects 130 and 131. In this embodiment, each stitcher object will walk through the edit list searching for editing requests for its associated channel. By way of example, stitcher 147 will walk through edit list 108 to identify editing requests for channel 1, and likewise, stitcher 148 will walk through edit list 108 to identify editing operators for channel N, and so on. Once glue objects 130 and 131 are created, glue objects 130 will to provide each stitcher 147 and 148 with glue data that may have been generated during the first pass.

In this example, glue object 130 is charged with retrieving the various glue segments for the copied segment. By way of example, glue object 130 may retrieve glue data stored in A.MPEG glue file 126 and provide it to stitcher 147. Further, if any middle-glue data (i.e., unprocessed portion of the clipped segment) is required, glue object 130 will use pointers 134 to a streamer 122 controlled by control object 111. In this manner, glue object 130 will be able to retrieve the correct frames from the A.MPEG file 124. In this embodiment, middle-glue may be associated with frames 15 through 23 in display order stream 52 of FIG. 1. Therefore, as each stitcher 147 and 148 requests glue data, glue objects 130 and 131 will retrieve the data from the appropriate location. As each stitcher receives requested data in a time ordered manner, each stitcher will transfer PES data streams to a MUX unit 150 that multiplexes the received PES data streams and sends a single stream to application 106 through MEDIT 102.

Figure 3:
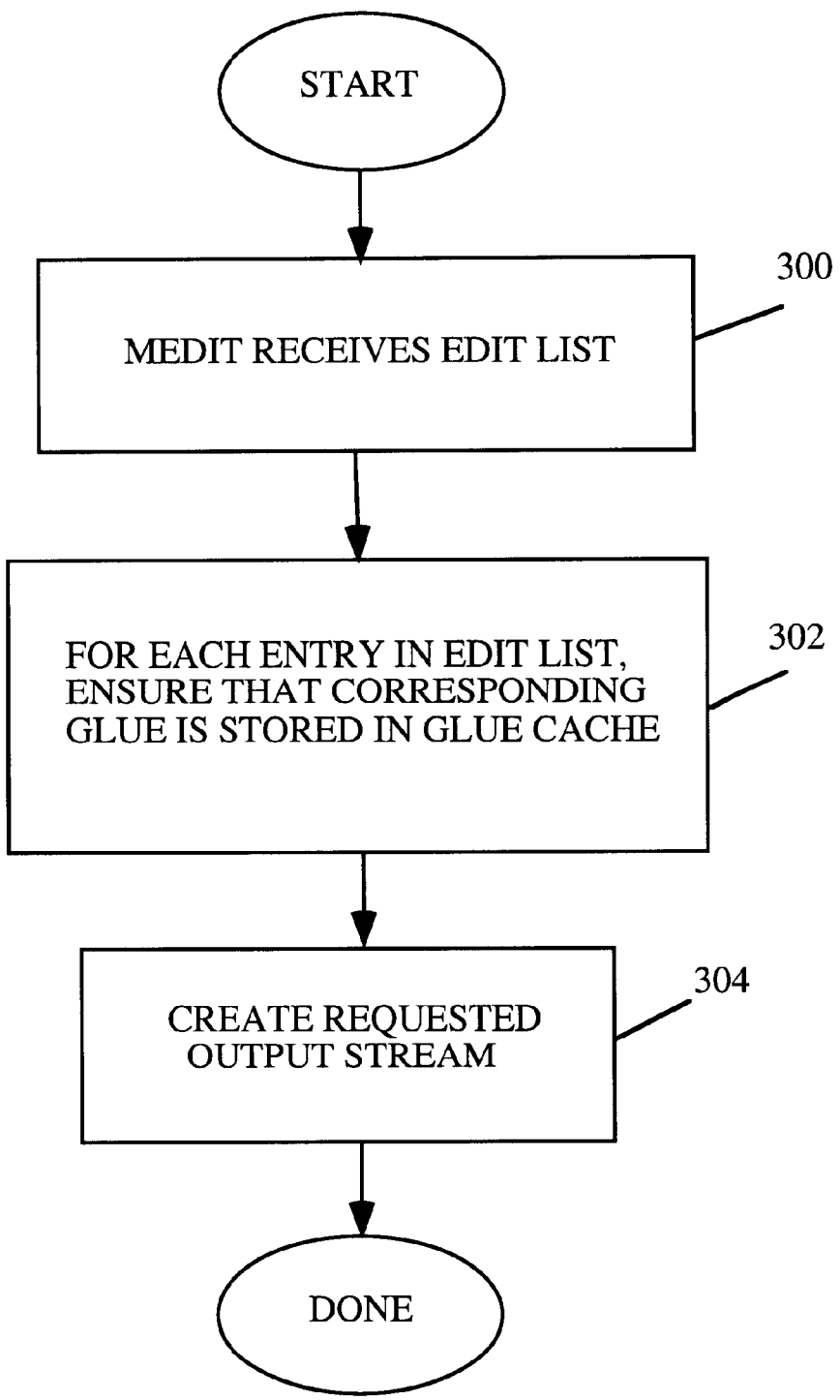
FIG. 3 is an overview flowchart illustrating a method of editing video files in accordance with one embodiment of the present invention.

FIG. 3 is an overview flowchart identifying the preferred method steps for editing video files in accordance with one embodiment of the present invention. The method begins at a step 300 where MEDIT engine receives an edit list. As described above, an edit list will generally contain a number of channel operators that identify the number and type of channels required for a particular editing request. For example, there are typically separate channels for both video and audio. There may also be a number of separate video channels and a number of separate audio channels.

Referring to FIG. 2, once application 106 sends an edit list 108 to MEDIT engine 102, the method will proceed to a step 302 where glue segments are generated for each copy request in edit list 108. In this embodiment, there may be any number of glue segments for a particular copy operation in edit list 108. Thus, the glue segments may include in-glue, middle-glue (i.e., "un-processed" frames) and an out-glue. Of course, it should be understood that if a clip is defined by a group of frames that start with an I frame, and ends with an I or a P frame, then only a middle-glue segment will be generated for that clip. Once glue segments are generated for a particular sequence of frames in a particular file, the generated glue segments are stored as glue files for use in the second pass, or future editing operations.

Thus, if the same range of frames is clipped in a future editing operation, the previously generated glue segments may be re-used. Advantageously, this avoids having to inefficiently re-generate the same glue files from scratch. In fact, the glue segment files may be distributed throughout a network and be retrieved upon a requested editing operation.

Once the appropriate glue segments have been generated and stored to an appropriate memory location (e.g., cache memory), the method proceeds to a step 304 where the requested output stream is created during the second pass by the MEDIT engine 102 shown in FIG. 2. As shown, multiple stitcher objects are created for each channel operator, and each stitcher object may walk through the edit list requesting data for each function operator in the edit list. Thus, each stitcher object will be responsible for pulling data from various glue files with the aid of a glue manager (i.e., glue objects 130 and 131). In this manner, each stitcher will receive data from the glue objects, and then a multiplexing unit 150 will request PES stream data from each stitcher.

As the multiplexer pulls data from the associated stitcher objects, the multiplexer also sends the multiplexed data to the application via the MEDIT engine 102. It should be understood that the stream output by the multiplexer may be video, audio, or a multiplexed combination of video and audio data. Once the requested output stream has been sent to the application in step 304, the method is complete. FIGS. 4 through 13 will now be used to provide a more detailed description of the method steps associated with creating the edited output stream described in FIG. 3.

Figure 4:
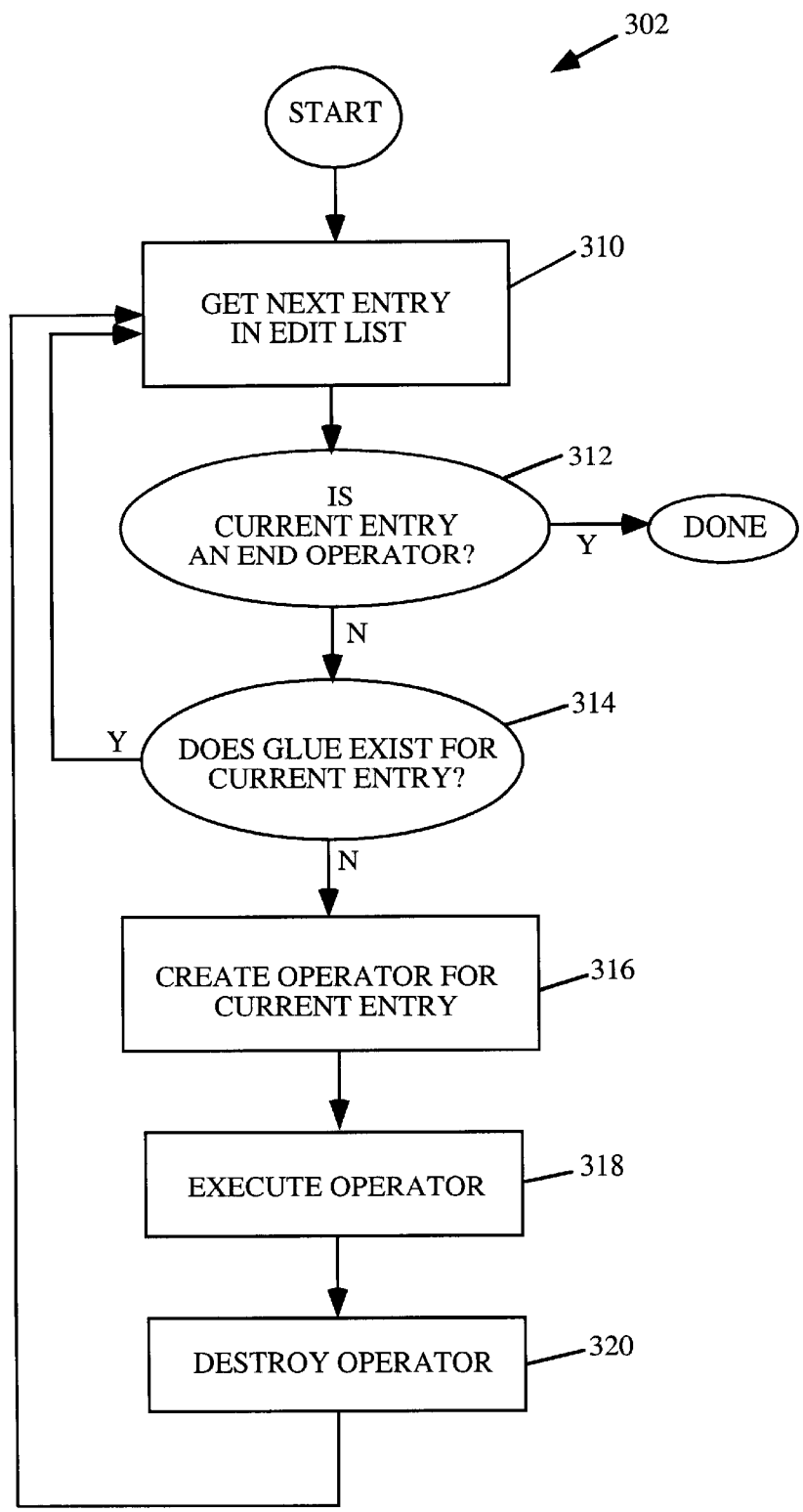
FIG. 4 is a flowchart illustrating a method of generating glue files for any suitable operator in accordance with one embodiment of the present invention.

FIG. 4 is a more detailed illustration of the method steps associated with generating glue for any suitable operator in accordance with one embodiment of the present invention. Initially, the MEDIT engine will walk through an edit list that may be provided by an application. Generally, the method begins at a step 310 where the MEDIT engine obtains the next entry in an edit list. Once the MEDIT engine has the current entry in the edit list, the method proceeds to a decision step 312. At decision step 312, it is determined whether the current entry in the edit list is an "END" operator. If the current entry is an END operator, the method of FIG. 4 will be done.

If the current entry is not an END operator, the method will proceed to a second decision step 314 where a determination is made as to whether glue exists for a current entry in the edit list. If glue already exists for the current entry in the edit list, the method will proceed back to step 310 where the next entry in the edit list is processed as described above. On the other hand, if in step 314, it is determined that glue does not exist for the current entry, the method will proceed to a step 316 where an operator is created by MEDIT for the current entry. Of course, the type of operator created will depend on the type of entry in the edit list. If the entry is a copy request, then a copy operator will be created as described in FIG. 2.

It should therefore be appreciated that any suitable operator may be created by MEDIT depending on the type of editing request provided in an edit list. By way of example, suitable editing operators may include blend operators, fade operators, morphing operators, titling operators, and text annotation operators. Further, new operators may be created by MEDIT in the future depending on the type of operators installed by applications making use of the MEDIT editing engine of this invention.

Once the appropriate operator is created in step 316, the method will proceed to a step 318 where the operator is executed to generate the requested glue segments for the particular type of operation requested in the edit list. A more detailed description of the method steps associated with executing an operator is described with reference to FIGS. 5A–5C. Once the glue segments are generated for the particular editing operation in step 318, the method proceeds to a step 320 where the operator is destroyed. Once the current operator is destroyed, the method will revert back to step 310, where the next entry in the edit list is received and again processed through to step 320 as described above.

Figure 5A:
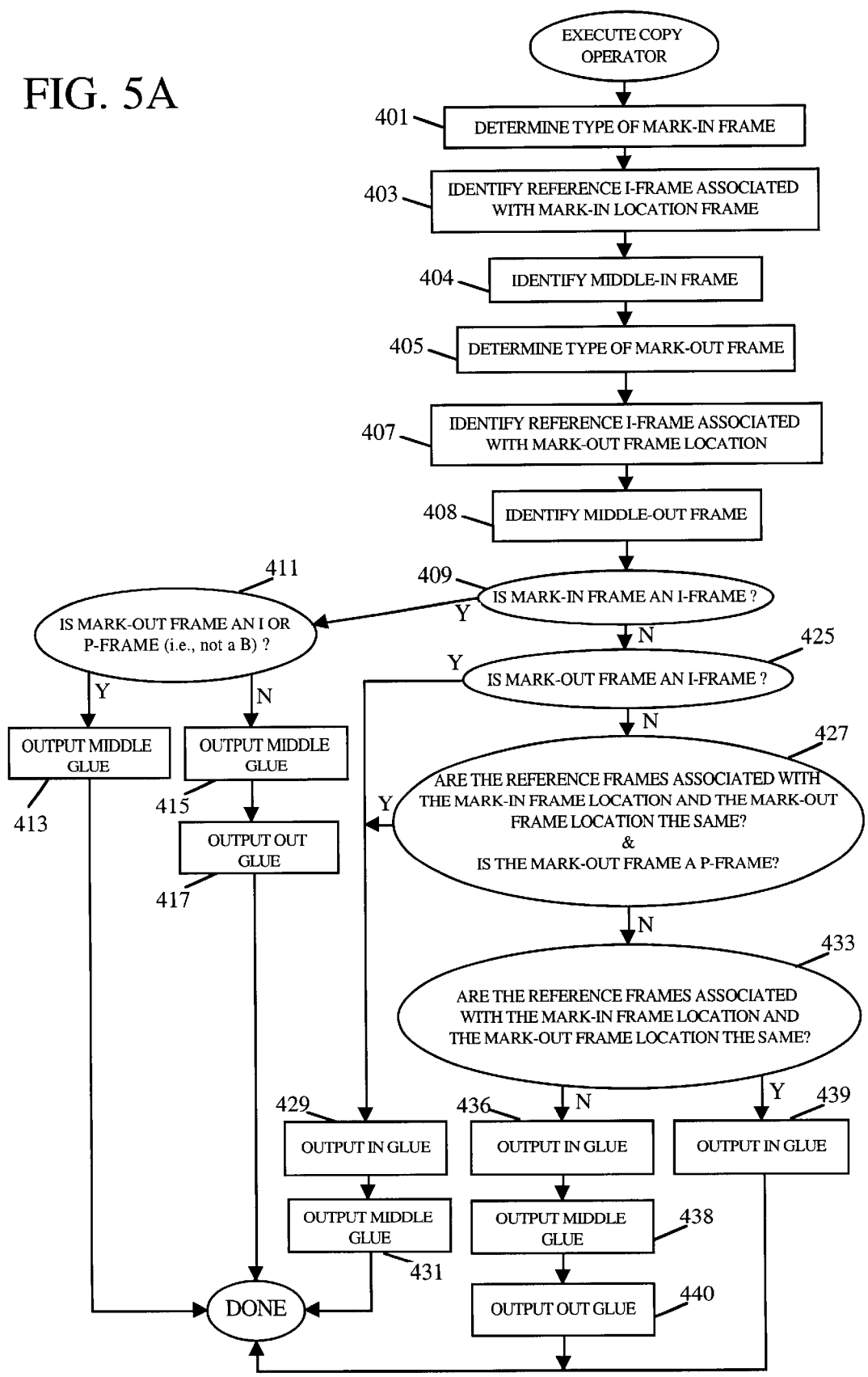
FIG. 5A is a flowchart illustrating the process steps associated with executing a copy operator in accordance with one embodiment of the present invention.

FIG. 5A is a more detailed description of the process steps associated with executing a copy operator in accordance with one embodiment of the present invention. The method begins at a step 401 where it is determined what type of frame is located at a mark-in location. For ease of description, reference will be made to the exemplary display order stream 52 of FIG. 1 where the "mark-in" frame is frame 9. In this example, frame 9 is a P-frame. Once the type of frame at the mark-in location is determined, the process proceeds to a step 403 where a "reference I frame" associated with the mark-in frame location is identified. In this example, the reference I frame associated with the mark-in location is frame 6, which is the closest previous I frame from the mark-in frame 9. However, in cases where the mark-in frame is an I frame, the reference I frame will be the mark-in frame itself. Furthermore, it should be appreciated that when the mark-in frame is an I frame, the mark-in frame will also be the middle-in frame, and therefore no in-glue segment is generated.

Once the I frame associated with the mark-in location frame is identified, the process will proceed to a step 404 where the middle-in frame is identified. In this example, the middle-in frame is preferably the next I frame in the display order stream 52. In this example, the middle-in frame is I frame 15. As is well known in the art, groups of pictures (GOPs) are typically a set of frames that begin with an I frame, and continue to one frame before the next I frame. Once the middle-in frame 15 is identified in step 404, the method proceeds to a step 405 where the type of mark-out frame is determined. As shown in display order stream 52, the mark-out frame is B frame 28.

The method now proceeds to a step 407 where a "reference I frame" associated with the mark-out frame location frame 28 is identified. In this embodiment, the most previous I frame 24, is identified as the reference I frame associated with the mark-out location. As described above, in cases where mark-out frame 28 which is an I-type frame, the reference I frame associated with the mark-out frame location is frame 28. The method now proceeds to a step 408 where a middle-out frame is identified. In this example, the middle-out frame is also the most previous I frame from mark-out frame 28 which will be I frame 24.

Once the middle-out frame has been identified, the method will proceed to a decision step 409 where it is determined whether the mark-in frame is an I frame. For illustration purposes, although the mark-in frame 9 in display order stream 52 is not an I frame, if it were an I frame, then the method would proceed to a decision step 411 where it is determined if the mark-out frame is an I or a P frame (i.e., not a B frame). If the mark-out frame is not a B frame, the method will proceed to a step 413 where only a middle-glue will be output, and no in-glue nor out-glue will be output since the mark-in frame is an I frame, and the mark-out frames will not require information from future frames in order to be decoded.

On the other hand, if it is determined in step 411 that the mark-out frame is a B frame, then the method will proceed to a step 415 where a middle-glue is output. By way of example, a middle glue may include frames 15 through 23 in display order stream 52 of FIG. 1. Once middle-out glue has been output in step 415, the method will proceed to a step 417 where an out-glue is output. Again referring to display order stream 52, out-glue may be frames 24 through 28. Once both middle-glue and out-glue are output in steps 415 and 417, the method for executing the copy operator will be done.

Referring again to step 409, if it is determined that the mark-in frame 9 is not an I frame, the method will proceed to a step 425 where it is determined whether the mark-out frame is an I frame. If it is determined that the mark-out frame is not an I frame, then the method will proceed to a decision step 427 where it is determined whether the reference frames associated with the mark-in frame location and the mark-out frame location are the same, and it is also determined whether the mark-out frame is a P frame. If it is determined that both conditions are met, then the method will proceed to a step 429 where an in-glue is output.

Exemplary in-glue frames may correspond to frames 9 through 14 (i.e., after being decoded and re-encoded) as shown in display stream 12 of FIG. 1. Once the in-glue is generated and output, the method will proceeds to a step 431 where a middle glue is output. In this example, the middle-glue will preferably correspond to frames 15 through 23 in display order stream 12 of FIG. 1. Once the middle-glue is output in step 431, the method associated with executing the copy operator will be done.

Referring back to step 425, if it is determined that the mark-out frame is an I frame, then the method will proceed through steps 429 and 431 as described above. In addition, if in step 427 both conditions are not met, the method will proceed to a decision step 433 where it is again determined whether the reference frames associated with the mark-in frame location and the mark-out frame location are the same.

By way of example, the reference frame associated with the mark-in frame is frame 6, and the reference frame associated with the mark-out frame is frame 24. Therefore, they are not the same and the method will proceed through steps 436, 438 and 440 where an in-glue, a middle-glue, and an out-glue are output, respectively. At this point, the execute copy operator will be done. On the other hand, if it is determined in step 433 that the reference frame associated with the mark-in frame location and the mark-out frame location are the same, the method will proceed to a step 439 where only an in-glue is output and the execute copy operator will be done.

Figure 5B:
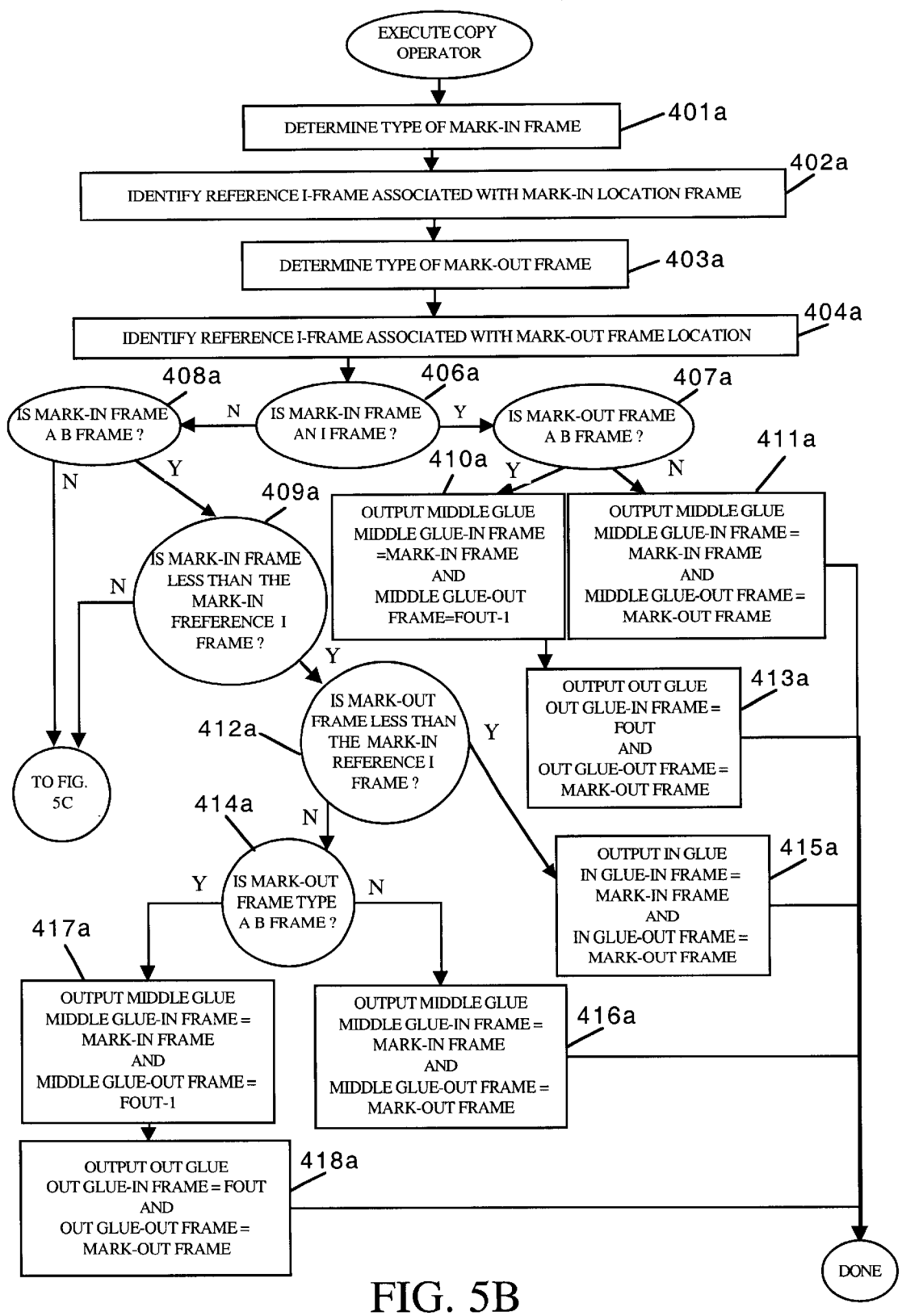
FIG. 5B is a flowchart diagram illustrating the method steps for executing a copy operator in accordance with another embodiment of the present invention.

FIG. 5B is a flowchart diagram illustrating the method steps for executing a copy operator in accordance with another embodiment of the present invention. The method for executing a copy operator begins at a step 401a. In step 401a, the method determines what type of frame is located at a mark-in location. For ease of description, reference will be made to the exemplary display order stream 52 of FIG. 1 where the mark-in frame is frame 9. For this example, frame 9 is a P frame. Once the type of frame at the mark-in location is determined in step 401a, the method proceeds to a step 402a where a reference I frame associated with the mark-in frame location is identified. In this embodiment, the reference I frame associated with the mark-in location is frame 6, which is the closest previous I frame from the mark-in frame 9.

It should be appreciated that in cases where the mark-in frame is an I frame, the referenced I frame will be the mark-in frame itself. Furthermore, it should be appreciated that when the mark-in frame is an I frame, the mark-in frame will also be the middle-in frame, and therefore no in-glue segment is needed. Once the I frame associated with the mark-in location is identified in step 402a, the method proceeds to a step 403a where the type of mark-out frame is determined. In this example, the markout frame is frame 28 which is a B frame.

The method now proceeds to a step 404a where the referenced I frame associated with the mark-out frame 28 is identified. In this example, the most previous I frame is I frame 24. As described above, in cases where mark-out frame 28 is an I-type frame, the reference I frame associated with the mark-out frame location will be frame 28 itself. Once the referenced I frame associated with the mark-out frame location is identified in step 404a, the method proceeds to a decision step 406a.

In decision step 406a, it is determined whether the mark-in frame is an I frame. Assuming the mark-in frame is an I frame, the method proceeds to a decision step 407a where it is determined whether the mark-out frame is a B frame, since the mark-out is a B frame as shown in display order stream 52 of FIG. 1, the method will proceed to a step 410a where a middle glue is output. In this example, the middle glue-in frame will be the same as the mark-in frame, and the middle glue-out frame will be FOUT- 1.

As used in this embodiment, FOUT is a "frame" that is the "middle glue-out" frame when the "middle glue-out" frame is an I or a P frame. On the other hand, if the "middle glue-out" frame is a B frame, FOUT is the first I frame or P frame preceding the "middle glue-out" frame in display order plus one frame position in stream order. By way of example, when B2 is the "middle glue-out" frame in a stream defined by an I frame, followed by a P frame, followed by a $B_1$, and followed by a $B_2$, the FOUT frame will be frame $B_1$. Using the aforementioned definition, the middle glue-out frame in step 410a will be FOUT-1.

Once the middle glue is output in step 410a, the method proceeds to a step 413a where the out-glue is output. In this example, the out glue-in frame is equal to FOUT, and the out glue-out frame is equal to the mark-out frame itself. As shown in the display order stream 52 of FIG. 1, the mark-out frame is B frame 28. Once the middle glue and the out-glue has been output in steps 410a and 413a, the method of executing the copy operator is done.

Referring back to decision step 407a, assuming the mark-out frame is not a B frame, the method will proceed to a step 411a where only a middle glue is output. In this example, the middle glue-in frame is preferably equal to the mark-in frame, and the middle glue-out frame is equal to the mark-out frame. Once the middle glue is output, the method will be done.

Reference is now drawn back to decision step 406a where, if the mark-in frame is not an I frame (e.g., as is the case for display order stream 52 of FIG. 1), the method will proceed to a decision step 408a where it is determined whether the mark-in frame is a B frame. If the mark-in frame is a B frame, the method will proceed to a decision step 409a where it is determined whether the mark-in frame is less than the mark-in referenced I frame. As used herein, "less than" means a frame that is displayed earlier in time, such that it has a numerically smaller temporal reference number.

If the mark-in frame is less than the mark-in referenced I frame, the method will proceed to a decision step 412a where it is now determined whether the mark-out frame is less than the mark-in referenced I frame. If the mark-out frame is less than the mark-in referenced I frame, the method will proceed to a step 415a where in-glue is output. In this example, the in glue-in frame is equal to the mark-in frame, and the in glue-out frame is equal to the mark-out frame. Once the in-glue is output, the method will be done.

Returning back to decision step 412a, if the mark-out frame is not less than the mark-in reference I frame, the method will proceed to a decision step 414a where it is determined whether the mark-out frame type is a B frame. If the mark-out frame type is a B frame, the method will proceed to a step 417a where a middle glue is output. In this example, the middle glue-in frame is equal to the mark-in frame, and the middle glue-out frame is equal to FOUT-1 as defined above. Once the middle glue is output, the method will proceed to a step 418a where an out-glue is output. In this example, the out glue-in frame is equal to FOUT, and the out glue-out frame is equal to the mark-out frame. Once the out-glue is output in step 418a, the method will be done.

Figure 5C:
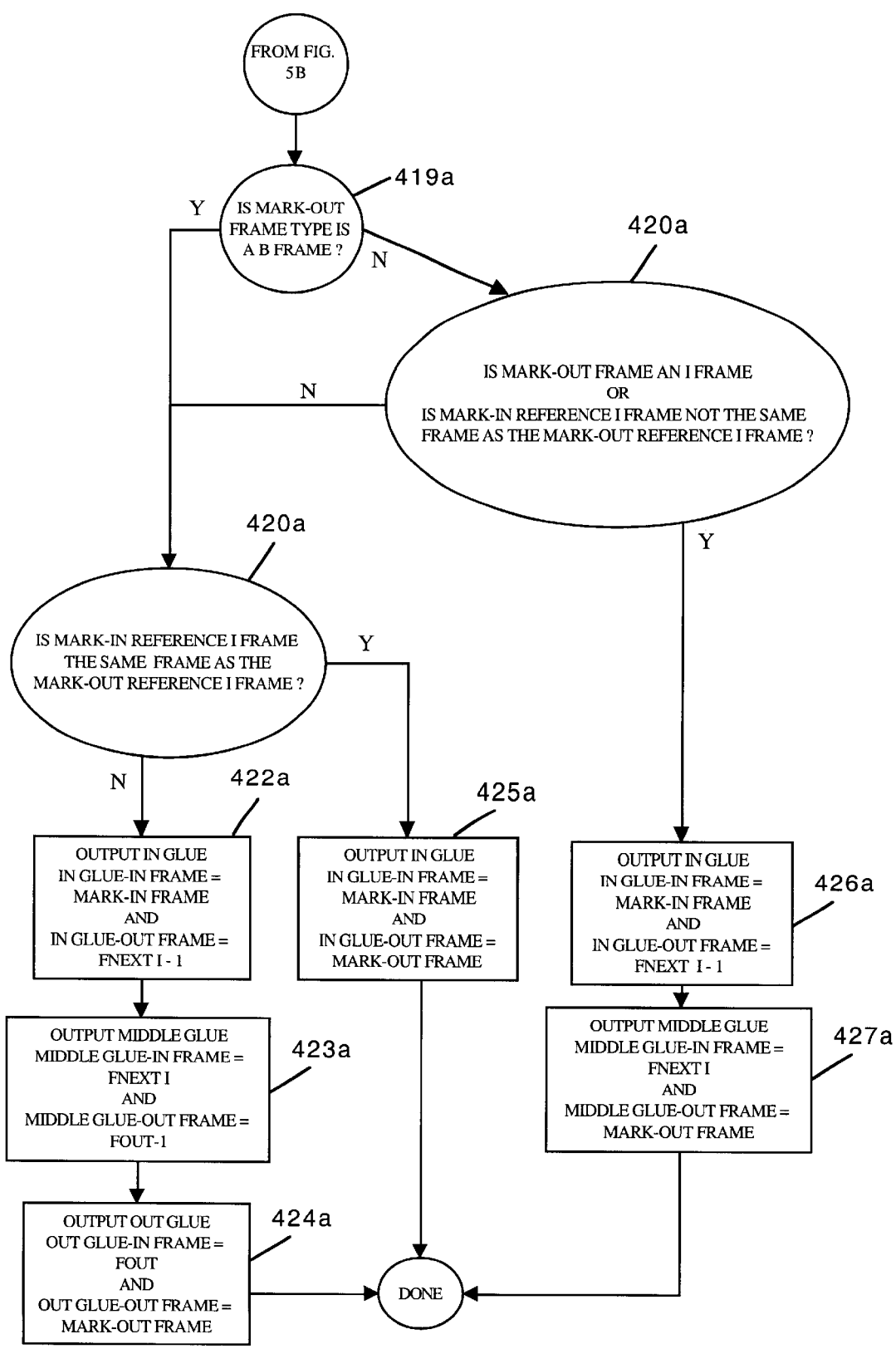
FIG. 5C is a continuation of the flowchart diagram of FIG. 5B in accordance with another embodiment of the present invention.

Referring back to decision step 409a, if it is determined that the mark-in frame is not less than the mark-in referenced I frame, the method will proceed to FIG. 5C. Likewise, if it is determined in step 408a that the mark-in frame is not a B frame, the method will also proceed to FIG. 5C.

FIG. 5C is a continuation of the flowchart diagram of FIG. 5B in accordance with another embodiment of the present invention. In decision step 419a, it is determined whether the mark-out frame type is a B frame. If it is determined that the mark-out frame type is not a B frame, the method will proceed to a decision step 420a where it is determined whether: (a) the mark-out frame is an I frame; (b) or if the mark-in referenced I frame is not the same frame as the mark-out referenced I frame. If either condition is satisfied, the method will proceed to a step 426a where in-glue is output. In this example, the in glue-in frame will be equal to the mark-in frame, and the in glue-out frame will be equal to FNEXT I-1.

As used herein, FNEXT I means the next I frame in display order with respect to a current frame. Thus, in glue-out frame will be the next I frame minus one frame in display order, of course. Once the in-glue is output in step 426a, the method will proceed to a step 427a where a middle glue is output. In this example, the middle glue-in frame will be FNEXT I, and the middle glue-out frame will be the mark-out frame itself. Once the middle glue is output, the method will be done.

Referring back to decision step 420a, if neither condition is satisfied, the method will proceed to a decision step 421a where it is determined whether the mark-in reference I frame is the same frame as the mark-out reference I frame. If this condition is satisfied, the method will proceed to a step 425a where in-glue is output. In step 425a, in-glue is output. In this example, the in glue-in frame is equal to the mark-in frame, and the in glue-out frame is equal to the mark-out frame. Once the in-glue is output, the method will be done.

Referring back to decision step 421a, if the mark-in reference I frame is not the same as the mark-out reference I frame, the method will proceed to a step 422a where in-glue is output. In this example, the in glue-in frame will be equal to the mark-in frame, and the in glue-out frame will be equal to the FNEXT I - 1 frame. The method now proceeds to step 423a where a middle glue is output. In this example, the middle glue-in frame is equal to FNEXT I, and the middle glue-out frame is equal to FOUT-1. The method then proceeds to a step 424a where out-glue is output. In this example, the out glue-in frame is equal to FOUT, and out glue-out frame is equal to the mark-out frame. Once the out-glue is output, the method for executing the copy operator will be complete.

Figure 6:
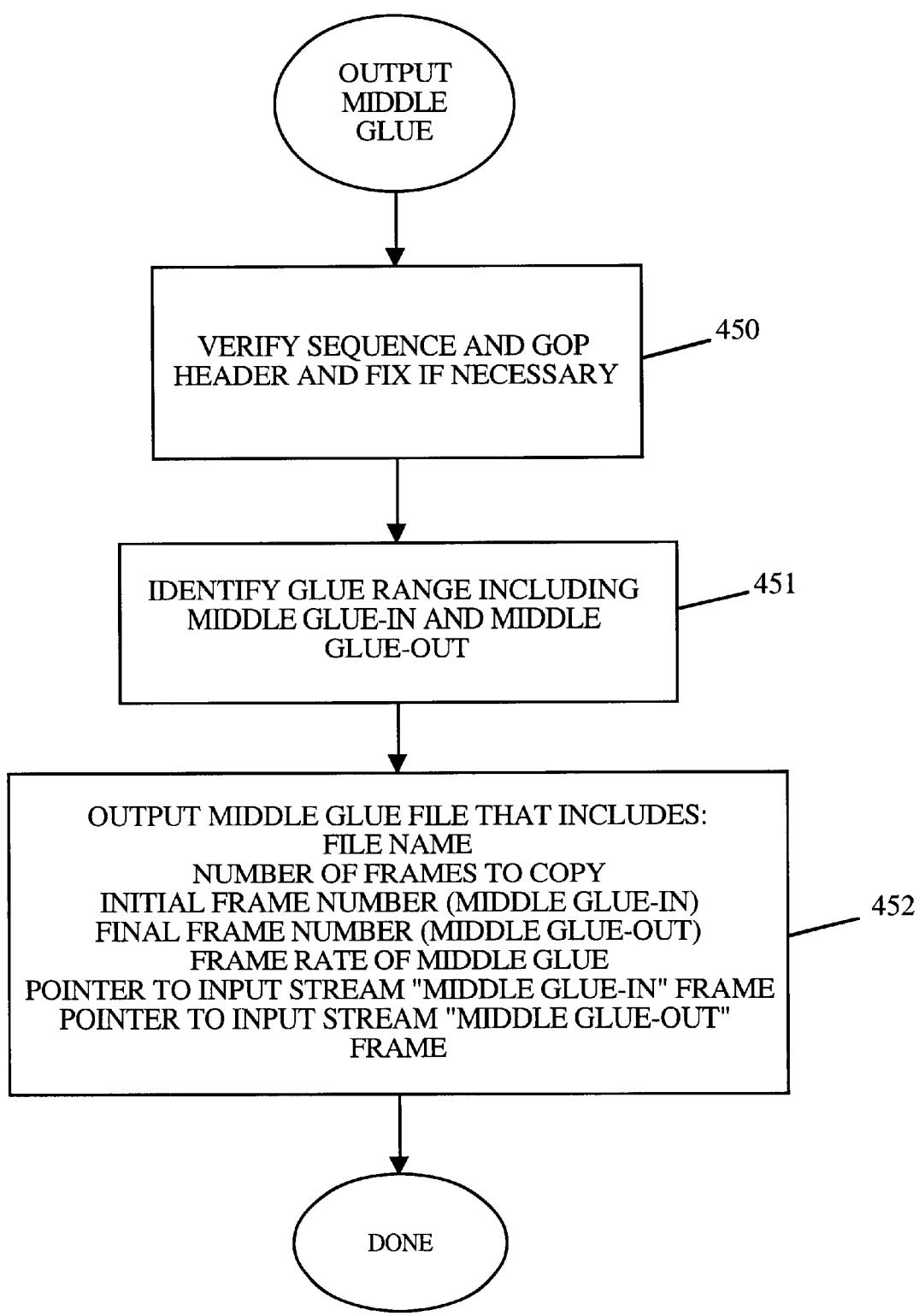
FIG. 6 is a flowchart illustrating the method steps associated with outputting a middle-glue of FIGS. 5A–5C in accordance with one embodiment of the present invention.

FIG. 6 is a flowchart diagram illustrating the method steps associated with outputting a middle-glue as described in FIGS. 5A–5C. The method begins at a step 450 where sequence and group of pictures (GOP) headers are verified and fixed, if necessary. This is typically required to assure that the generated video bit streams comply with certain organizational requirements established by the MPEG standard. Therefore, once the bit stream is formatted to comply with the MPEG standard, subsequently used MPEG decoders will appropriately recognize the bit stream.

From step 450, the method proceeds to a step 451 where the glue range is identified for the beginning and the end of the glue frames. By way of example, with reference to display order stream 52 of FIG. 1, the beginning frame of a middle-glue is I frame 15 and the end frame of the middle-glue is frame 23. Thus, the range of glue frames will define a frame 15 as "middle-glue-in" and frame 23 as "middle-glue-out."

Once the middle-glue range is identified in step 451, the method will proceed to a step 452 where a middle-glue file is output that includes a number of identifiers. By way of example, the output file will preferably have a file name, the number of frames associated with the middle-glue segment, the initial frame number (middle-glue-in), the final frame number (middle-glue-out), the frame rate of the middle-glue, pointers to an input stream identifying the "middle-glue-in" frame, and pointers to the input stream identifying the "middle-glue-out" frame. In this embodiment, the middle-glue will preferably be un-processed frames (e.g., not decoded and re-encoded) that are "copied" from an input file when the stitcher calls for the middle-glue segment in the second pass. Once the middle-glue output file has been generated in step 452, the method of generating middle-glue will be done.

Figure 7:
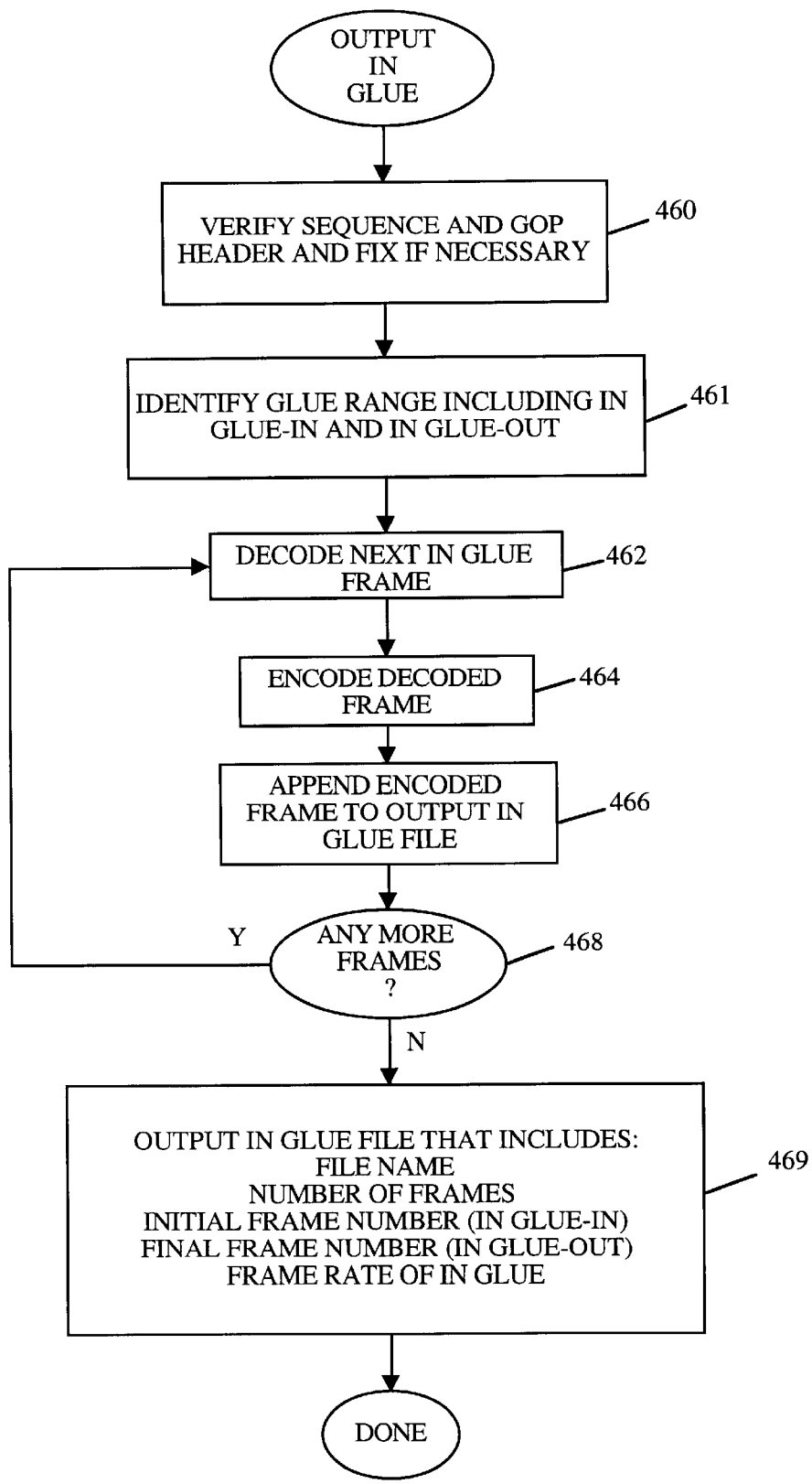
FIG. 7 is a flowchart illustrating the method steps associated with outputting an in-glue of FIGS. 5A–5C in accordance with one embodiment of the present invention.

FIG. 7 is a flowchart diagram describing the method steps associated with outputting an in-glue as described in FIGS. 5A–5C. The method begins at a step 460 where the sequence and group of pictures (GOP) headers are fixed, if necessary. As described above, if the glue file bit stream does not comply with the MPEG standard requirements, the bit stream will be fixed to comply with the MPEG standard decodable order. The method then proceeds to a step 461 where the glue range is identified for the segment of in-glue which includes an "in-glue-in" frame and extends to an "in-glue-out" frame. By way of example, with reference to display order stream 52 of FIG. 1, the in-glue segment will preferably include frames 9 through 14.

Once the glue range for the in-glue has been identified in step 461, the method proceeds to a step 462 where the first in-glue frame is decoded. By way of example, the first frame that will be decoded is preferably P frame 9. It should be appreciated that frame 9 is only decodable once the most previous I frame 6 is decoded to provide the decoder with sufficient context to decode P frame 9. Thus, once I frame 6 has been decoded, P frame 9 may be decoded. Referring to the data flow architecture of FIG. 2, once frame 9 has been identified in A.MPEG file 124 by seek engine 118 of control object 111, the identified data is retrieved and demultiplexed by a DEMUX unit 121 which isolates the video bit stream from the audio bit stream. Thereafter, frame 9 is sent to decoder 120 where the frame information is decoded into pixel bit map data. The pixel bit map data is then sent to copy operator 104 which then sends the data to encoder 114. At this point, the method proceeds to a step 464 where frame 9 is encoded by encoder 114 lying within control object 113.

In this embodiment, frame 9 is preferably re-encoded into an I frame. Of course, for frames after frame 9 in the in-glue segment (i.e., frames 10 through 14), the frames may optionally be encoded as I frames, P frames, and P and B frames depending on the particular settings of the encoder 114 implemented in step 464. Once the frame has been encoded, the method proceeds to a step 466 where the encoded frame is appended to the output in-glue file (i.e., A.MPEG GLUE 126) by glue object 116.

The method now proceeds to a decision step 468 where it is determined whether there are anymore frames in the in-glue range of frames identified in step 461. If there are more frames, the method will again proceed to a step 462 where the next frame in the in-glue segment is decoded as described above. Once the next frame is decoded in step 462, the method will again proceed to step 464 where the frame may be encoded as either I, P or B frames. Therefore, once the frame has been encoded, the method will proceed to a step 466 where it is again appended to the output glue file. The method then proceeds to step 468 where it is again determined whether there are anymore frames in the in-glue range of frames identified in step 461.

If there are no more frames in the in-glue range of frames identified in step 461, the method will proceed to a step 469 where an in-glue file that includes the appended frames is output (e.g., A.MPEG glue file 126). By way of example, the glue file may include a file name, the number of frames in the in-glue segment, the initial frame number for the ("in-glue-in") frame, the final frame number for the ("in-glue-out") frame, and the frame rate of the in-glue segment. Once the output glue file is complete, the method is done for the method steps associated with outputting an in-glue as described in FIGS. 5A–5C.

Figure 8:
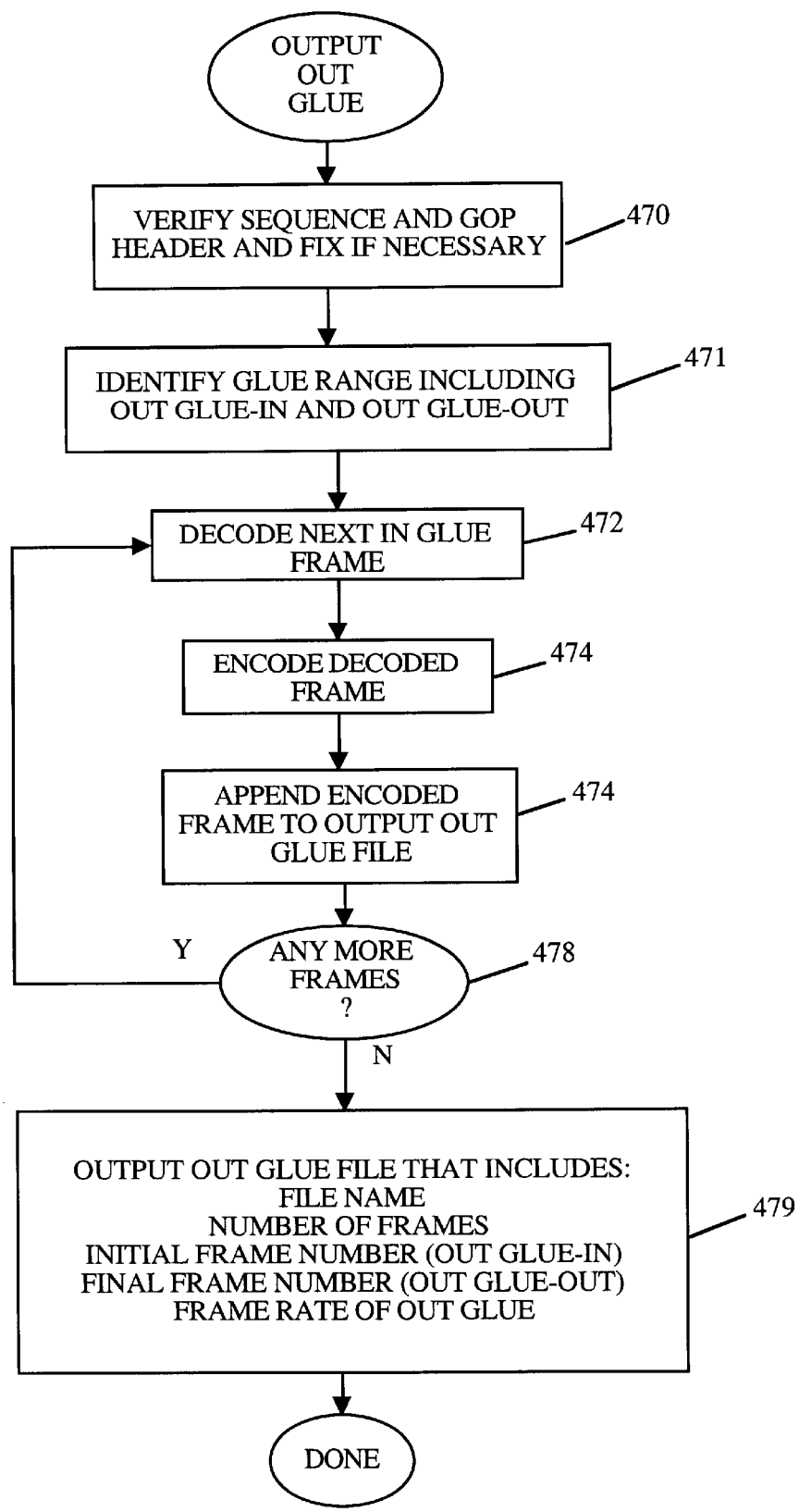
FIG. 8 is a flowchart diagram illustrating the method steps associated with outputting an out-glue of FIGS. 5A–5C in accordance with one embodiment of the present invention.

FIG. 8 is a flowchart diagram illustrating the method steps associated with outputting an out-glue as described in FIGS. 5A–5C. The method begins at step 470 where sequence and group of pictures headers are fixed, if necessary, to comply with MPEG standards as described above.

Once any necessary adjustments are made to the headers in step 470, the method will proceed to a step 471 where the glue range is calculated for the out-glue segment. By way of example, in display order stream 52 of FIG. 1, the out-glue segment begins at I frame 24 and extends through B frame 28. Once the out-glue range has been calculated in step 471, the method will proceed to a step 472 where B frame 25 in the out-glue segment is decoded. With reference to the data flow architecture of FIG. 2, once seek engine 118 has located and retrieved B frame 25 in a file such as A.MPEG file 124, the frame data is demultiplexed in DEMUX 121 to isolate the video component. Frame 25 is then decoded in DEC 120 which generates bitmap data from within control object 111. The bitmap data is then sent to copy operator 104 which sends the data to encoder 114 of control object 113. Once the bitmap data has been re-encoded by encoder 114 in a step 474, glue object 116 will append the encoded frame to a glue file (e.g., A.MPEG GLUE file 126) in a step 476.

The method will then proceed to a step 478 where it is determined whether there are anymore frames in the glue-out range. Since there are more frames in the glue-out range, the method will proceed back again to step 472 where the next frame is processed. By way of example, the next frame may be frame 26 which is decoded and then re-encoded in step 474. As described above, frames 25 through 28 may be encoded into any suitable encoding format which may include I frames, P frames, or B frames. Once the frame is encoded in step 474, the method will proceed to step 476 where the frame is appended to the out-glue file as described above.

The method will then continue to loop back to step 472 until all frames in the out-glue segment are processed in accordance with one embodiment of the present invention. When it is determined that there are no more frames for processing into outglue in step 478, the method will proceed to a step 479 where an output glue file is generated. By way of example, the glue file may include a file name, the number of frames in the out-glue segment, the initial frame number for the ("out-glue-in") file, the final frame number for the ("out-glue-out") file, and the frame rate of the out-glue segment. Once the output glue file is complete, the method is done for the process steps associated with outputting an out-glue as described in FIGS. 5A–5C.

Figure 9:
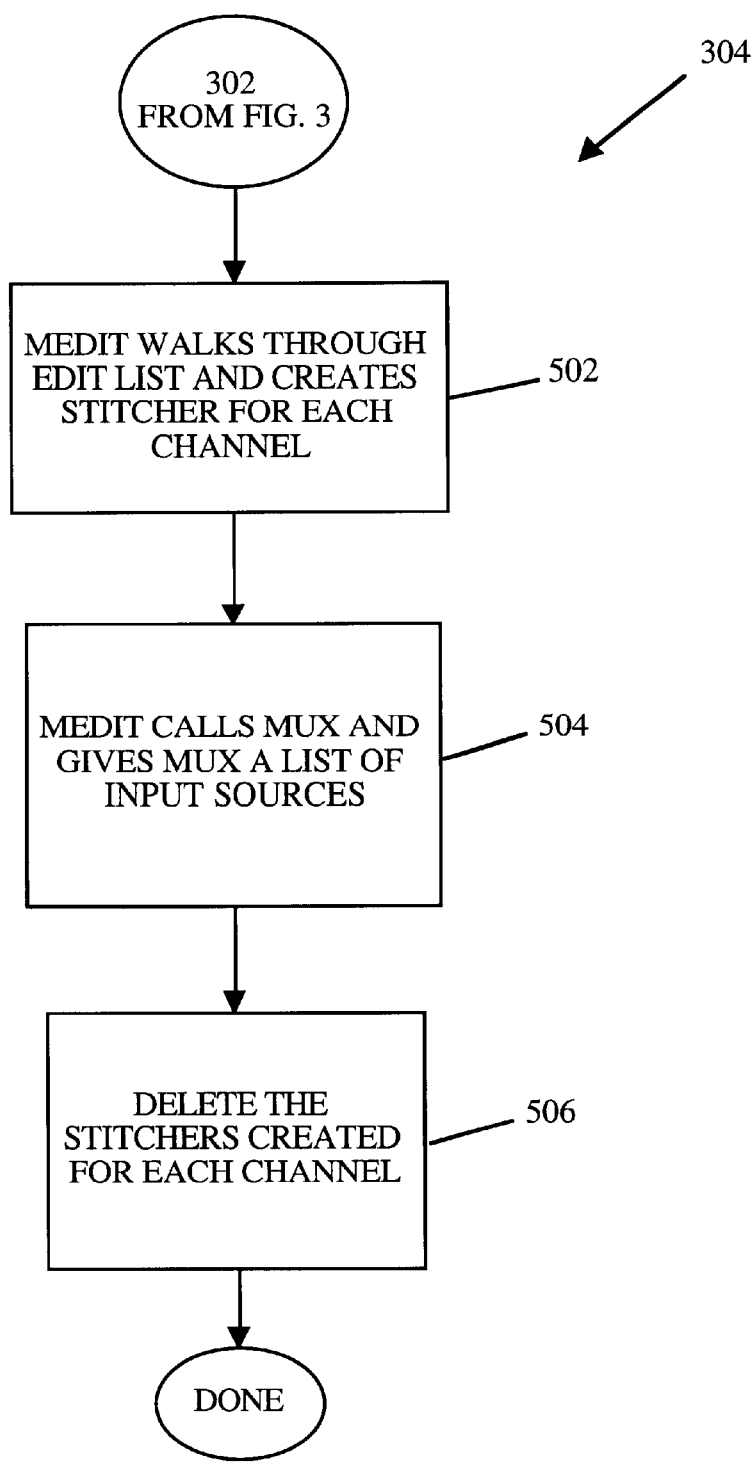
FIG. 9 is an overview flowchart of the method steps associated with creating the requested output stream during a second pass performed by the editing engine of this invention.

FIG. 9 is an overview flowchart of the method steps associated with creating the requested output stream during the second pass performed by MEDIT engine 102 as described in step 304 of FIG. 3. The method begins at a step 502 where MEDIT walks through an edit list and creates stitcher objects for each channel in the edit list. By way of example, an edit list may have numerous channels for displaying different video files. As shown in FIG. 2, exemplary channel operators 110 are identified for a channel 1 and extending to a channel N. Thus, associated stitcher objects are created for channel 1 and channel N, and are shown as stitcher object 147 and stitcher object 148, respectively.

Once the stitcher objects have been created for each channel identified in the edit list in step 502, the method will proceed to a step 504 where MEDIT calls a multiplexer 150 and gives the multiplexer a list of input sources. In this embodiment, multiplexor 150 is configured to pull data from input sources such as stitcher object 147 and stitcher object 148. However, it should be understood that multiplexor 150 may pull data from any number of suitable input sources other than stitcher objects 147 and 148. By way of example, the input sources may be embodied in any suitable form such as a file containing appropriate MPEG data.

The method then proceeds to a step 506 where the stitcher objects created for each channel are deleted once the stitcher objects have provided multiplexor 150 with appropriate input data from the un-processed input stream and the various glue files that may have been generated during the first pass as described above. After multiplexer 150 generates the requested clipped segment, the clipped segment is sent to the application through MEDIT engine 102. Once the clipped segments are output, the stitcher objects are deleted in step 506, and the second pass is done.

Figure 10:
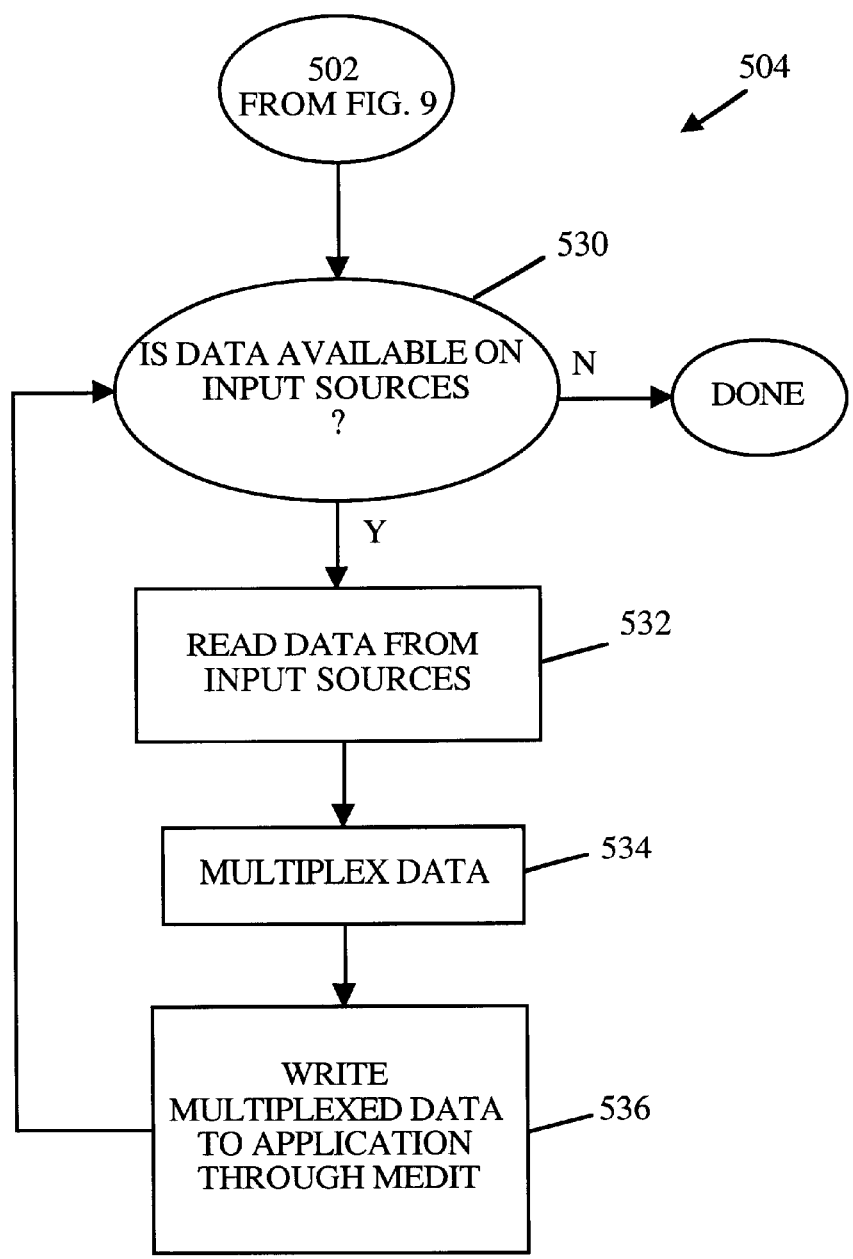
FIG. 10 is a more detailed description of the method steps associated with multiplexing data pulled from input sources in accordance with one embodiment of the present invention.

FIG. 10 is a more detailed description of the method steps associated with multiplexing data pulled from input sources as described in step 504 of FIG. 9. At a first step 530, the method determines whether data is available on any input sources provided to the multiplexor. If the multiplexer is not provided with any input sources, the multiplexer will be done. On the other hand, if there are input sources provided to the multiplexer, the method will proceed to a step 532 where data provided by the input sources is read by the multiplexer.

Once any available data has been read from the input sources in step 532, the method will proceed to a step 534 where the read data is multiplexed by a suitable multiplexing engine. By way of example, a suitable public domain multiplexing engine may be a one or two pass MPEG multiplexing engine, file name MPEG-1: Multi-Stream System Layer Encoder (multiplexer), developed by Z. Yaar, J. Boucher, J. Palmer, and E. Rubin (public domain, 1994). These multiplexing engines are available from Boston University, of Boston, Mass.

Once the data has been multiplexed in step 534, the method will proceed to a step 536 where the multiplexed data is read to MEDIT engine 102 and then sent to the application requesting the editing operation as described in FIG. 2. Once the multiplexed data is written to MEDIT, the process again proceed to decision step 530 where it is determined whether there are anymore available input sources. If there are available sources, the method will again loop through steps 532, 534, and 536 until there are no more input sources. Once there are no more input sources, the method will be done.

Figure 11:
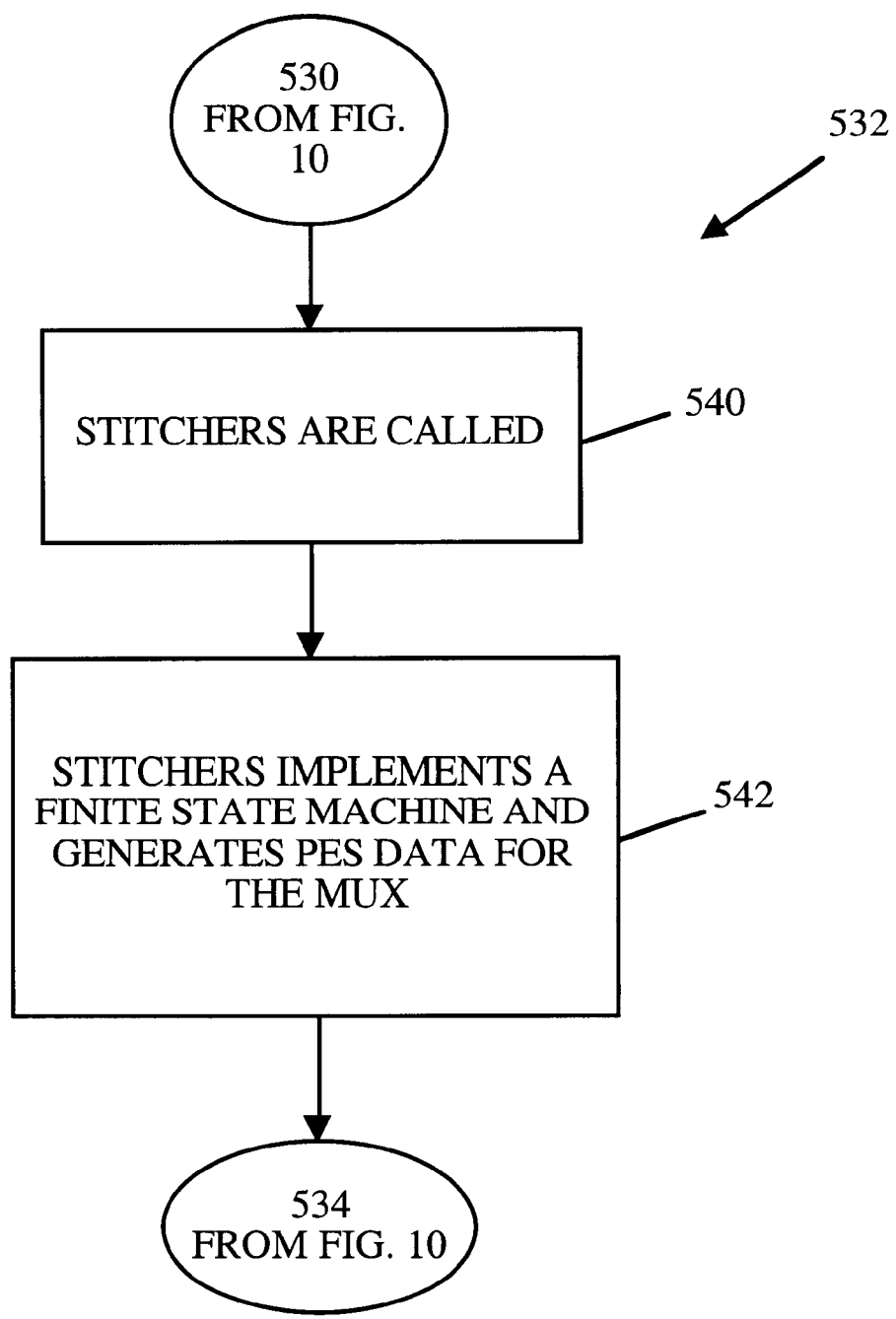
FIG. 11 is a general description of the method steps performed by stitcher objects in accordance with one embodiment of the present invention.

FIG. 11 is a more detailed description of the method steps performed by the stitcher objects when reading data from input sources as described in step 532. Initially, the method begins at a step 540 where the stitcher objects are called by the MEDIT engine 102. As described above, a stitcher is preferably created for each channel provided in an edit list. Once the appropriate number of stitcher objects have been created, the method will proceed to a step 542 where each stitcher implements a finite state machine in order to generate video program elementary streams (PES) for the multiplexer.

In general, the finite state machine is charged with opening the input sources, reading the input sources, and closing the input sources in a time ordered manner. Thus, each stitcher will preferably walk through the state machine attempting to open the various input sources and attempting read the video data. Once the data is read, the files are closed. If no data is found in the input sources (i.e., no "in, middle or out" glue was generated or needed), the state machine will proceed to the next file and proceed performing open, read, and close operations.

As described above, each of the stitchers use a glue object such as glue objects 130 and 131 to retrieve the glue files when requested. Therefore, each glue object is charged with retrieving the various pieces of glue files generated during the first pass as described in step 302 of FIG. 3. Advantageously, by implementing glue objects, it is irrelevant to the stitchers where each glue file is actually stored since the glue objects will retrieve the glue files from the appropriate location when requested by each stitcher. In this manner, each stitcher will loop through asking its associated glue object for glue files until there are no more glue files available for a particular copy operation.

Figure 12:
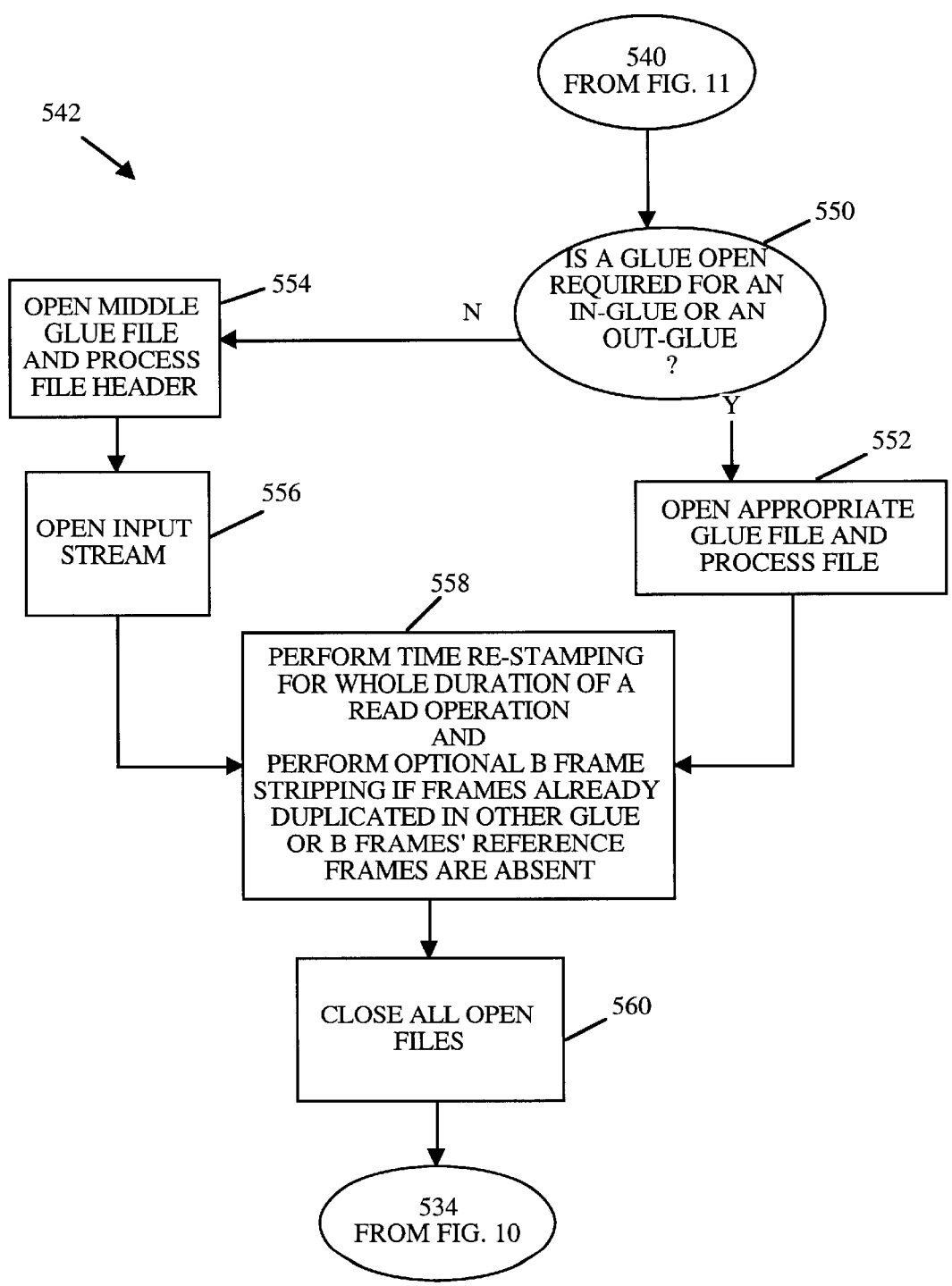
FIG. 12 is a more detailed description of the method steps performed by stitcher objects in accordance with one embodiment of the present invention.

FIG. 12 is a more detailed description of the method steps performed by each stitcher when implementing the finite state machine as described in step 542 of FIG. 11. The method begins at a step 550 where it is first determined whether an "open" is required for an in-glue or an out-glue. If an open is required for an in-glue or an out-glue, the method will proceed to a step 552 where the appropriate glue file is opened and the file header is processed as is well known in the art.

Once the file headers are processed, the method will proceed to a step 558 where a time re-stamping is performed for the opened glue file for the whole duration of a read operation. Also performed in step 558 is an optional B frame stripping. In general, during a read operation, the data is read into a buffer where the data is temporally held. Once in the buffer, the read contents are processed from beginning to end to determine appropriate time re-stamping, and to determine whether B frames should be stripped. Specifically, time re-stamping is performed for each GOP, and for each picture temporal reference. Once processed, the entire contents of the buffer are output to the multiplexer (e.g., MUX 150 of FIG. 2).

In this embodiment, B frame stripping for glue file data is preferably performed if the B frames are already duplicated in another glue file or, the B frame's reference frames are absent. By way of example, if the first I frame in a glue segment is followed by a B frame, then you strip all of the B frames up until the next frame that is a non-B frame. Of course, B frame stripping only occurs if the glue segment stream meets the above described conditions.

Once re-stamping and optional B frame stripping has been performed in step 558, the method will proceed to a step 560 where the state machine closes the open files. On the other hand, if an open was not required for an in-glue or an out-glue, the method will proceed to a step 554 where an open-middle-glue file and process file header step is performed. In this step, the headers of the middle-glue file are processed to assure that MPEG stream standards are met. Next, the method will proceed to a step 556 where the middle-glue file is open with reference to pointers indicating the location of the middle-glue. By way of example, as shown in FIG. 2, pointers 134 and 136 will identify the location of the beginning and ending frames in the input stream from which reading will be performed. Once the input stream has been opened in 556, the method will again proceed to step 558 where time re-stamping and optional B frame stripping is performed as described above. Once time re-stamping and optional B frame stripping is performed, the method will proceed to step 560 where the open files are closed.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 13:
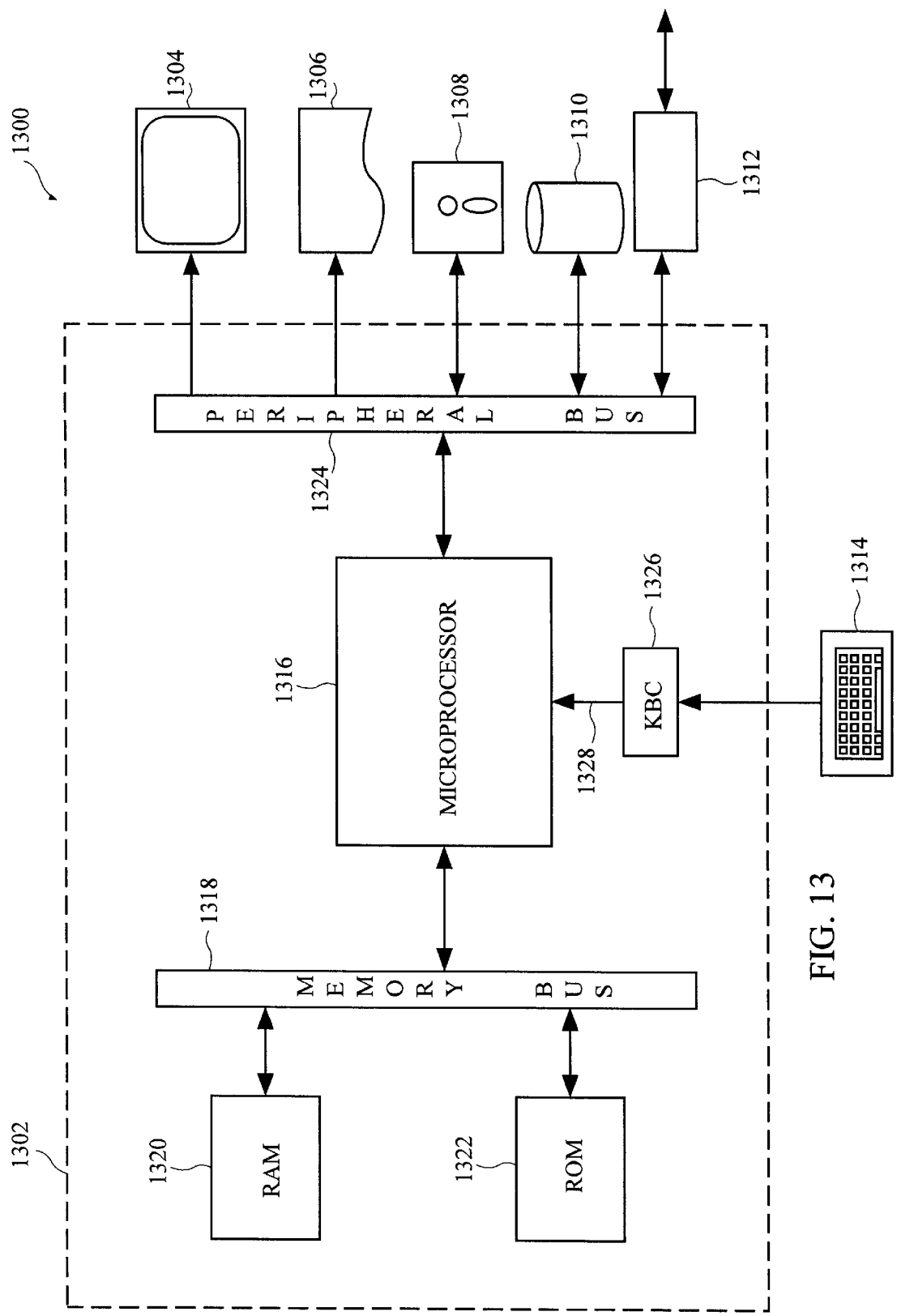
FIG. 13 is a block diagram of an exemplary computer system for carrying out the editing steps in accordance with one embodiment of the present invention.

FIG. 13 is a block diagram of an exemplary computer system 1300 for carrying out the processing according to the invention. The computer system 1300 includes a digital computer 1302, a display screen (or monitor) 1304, a printer 1306, a floppy disk drive 1308, a hard disk drive 1310, a network interface 1312, and a keyboard 1314. The digital computer 1302 includes a microprocessor 1316, a memory bus 1318, random access memory (RAM) 1320, read only memory (ROM) 1322, a peripheral bus 1324, and a keyboard controller 1326. The digital computer 1300 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1316 is a general purpose digital processor which controls the operation of the computer system 1300. The microprocessor 1316 can be a single-chip processor or can be implemented with multiple components. Using instructions retrieved from memory, the microprocessor 1316 controls the reception and manipulation of input data and the output and display of data on output devices. According to the invention, a particular function of microprocessor 1316 is to assist in the processing edit operations for MPEG video and audio streams.

The memory bus 1318 is used by the microprocessor 1316 to access the RAM 1320 and the ROM 1322. The RAM 1320 is used by the microprocessor 1316 as a general storage area and as scratch-pad memory, and can also be used to store input data and processed data. The ROM 1322 can be used to store instructions or program code followed by the microprocessor 1316 as well as other data.

The peripheral bus 1324 is used to access the input, output, and storage devices used by the digital computer 1302. In the described embodiment, these devices include the display screen 1304, the printer device 1306, the floppy disk drive 1308, the hard disk drive 1310, and the network interface 1312. The keyboard controller 1326 is used to receive input from keyboard 1314 and send decoded symbols for each pressed key to microprocessor 1316 over bus 1328.

The display screen 1304 is an output device that displays images of data provided by the microprocessor 1316 via the peripheral bus 1324 or provided by other components in the computer system 1300. The printer device 1306 when operating as a printer provides an image on a sheet of paper or a similar surface. Other output devices such as a plotter, typesetter, etc. can be used in place of, or in addition to, the printer device 1306.

The floppy disk drive 1308 and the hard disk drive 1310 can be used to store various types of data. The floppy disk drive 1308 facilitates transporting such data to other computer systems, and hard disk drive 1310 permits fast access to large amounts of stored data.

The microprocessor 1316 together with an operating system operate to execute computer code and produce and use data. The computer code and data may reside on the RAM 1320, the ROM 1322, or the hard disk drive 1320. The computer code and data could also reside on a removable program medium and loaded or installed onto the computer system 1300 when needed. Removable program mediums include, for example, CD-ROM, PC-CARD, floppy disk and magnetic tape.

The network interface 1312 is used to send and receive data over a network connected to other computer systems. An interface card or similar device and appropriate software implemented by the microprocessor 1316 can be used to connect the computer system 1300 to an existing network and transfer data according to standard protocols.

The keyboard 1314 is used by a user to input commands and other instructions to the computer system 1300. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The following MPEG audio and video standards described above are hereby incorporated by reference: (1) a document entitled "Generic Coding of Moving Pictures and Associated Audio Information: Video," ISO/IEC 13818-2; (2) a document entitled "Coding of Moving Pictures and Associated Audio for Digital Storage Media at up to about 1.5 MBit/s" (Part 1 System, Part 2 Video, Part 3 Audio) 11171/11172 (1995/1996); and (3) a document entitled "Generic Coding of Moving Pictures and Associated Audio Information" ISO/IEC 13818-3. All above-referenced MPEG standard documents and future MPEG standard documents may be obtained form ISO/IEC Case Postale 56, CH-1211, Geneva 20, Switzerland.

Although the preferred embodiments of the present invention have been described in detail, it should be understood that the present invention may be embodied in many other specific forms without departing from the spirit or scope of the invention. In the described embodiments, a distributed architecture has been described. Such an architecture has a number of advantages, particularly in terms of modularity and ease of introducing new functionalities. By way of example, new functionalities may be created merely by providing an additional "plug-in" operator object which may utilize many of the same component objects, such as the seeker, the decoder, etc.

While such a described architecture is believed to work particularly well, it should be appreciated that similar functionalities can be accomplished using other architectures as well. Therefore, the present examples and embodiments are to be considered as illustrative and not restrictive, and the invention is not to be limited to the details given herein, but may be modified within the scope and equivalence of the appended claims.

What is claimed is:

1. A method for clipping a segment from a video file having a multiplicity of video frames, wherein at least some of the frames are encoded as predicted frames, the method comprising the steps of:
   selecting a mark-in location in the video file, the mark-in location defining the beginning of the clipped segment;
   selecting a mark-out location in the video file, the mark-out location defining the end of the clipped segment;
   decoding a first frame associated with one of the mark-in location and the mark-out location, the first frame being a predictive frame having an associated first format;
   re-encoding the decoded first frame into a second format;
   storing the re-encoded first frame; and
   creating a clipped segment that includes the re-encoded first frame.

2. A method for clipping a segment from a video file as recited in claim 1, wherein the clipped segment has a size that corresponds to the number of frames from the mark-in location and extending to the mark-out location.

3. A method for clipping a segment from a video file as recited in claim 1, wherein the second format is an I-frame.

4. A method for clipping a segment from a video file as recited in claim 3, wherein the re-encoded first frame is stored as one of an in-glue and an out-glue files during a first pass of an editing engine.

5. A method for clipping a segment from a video file as recited in claim 4, further comprising a step of defining one or more frames in the clipped segment as middle-glue frames.

6. A method for clipping a segment from a video file as recited in claim 5, wherein the step of creating the clipped segment includes the substep of:
   stitching glue files selected from the group consisting of the in-glue, the middle-glue and the out-glue together to create the clipped segment.

7. A method for clipping a segment from a video file as recited in claim 6, wherein the stitching is performed in a second pass by the editing engine, and an associated glue object is used for retrieving data from at least one of the in-glue, middle-glue, and out-glue files.

8. A method for clipping a segment from a video file as recited in claim 5, further comprises the steps of:
   multiplexing the stitched glue files to generate multiplexed data; and
   outputting the multiplexed data that is identified as the created clipped segment to an application.

9. A method for clipping a segment from a video file as recited in claim 6, wherein the step of stitching glue files further comprises the steps of:
   opening one of the in-glue, middle-glue or out-glue files;
   read glue file data in a time ordered sequence; and
   close any open glue file.

10. A method for clipping a segment from a video file as recited in claim 9, wherein the step of reading glue file data further comprises the substeps of:
    performing time re-stamping for the duration of the step of reading glue file data;
    performing B-frame stripping when a particular B-frame is present in another glue file, and a reference frame for the particular B frame is absent.

11. A method for clipping a segment from a video file as recited in claim 1, wherein the step of decoding a first frame further comprises the step of:
    decoding a most previous I frame to provide a decoder with sufficient context.

12. A method for clipping a segment from a video file as recited in claim 1, where the re-encoded first frame is stored in a storage medium selected from the group consisting a cache memory, a computer hard drive, a floppy disk, and a remotely networked storage medium.

13. A method for copying a segment from a video file having a multiplicity of video frames, wherein at least some of the frames are encoded as predicted frames, the method comprising the steps of:
    selecting a mark-in location in the video file, the mark-in location defining the beginning of the copied segment;
    decoding each of the frames positioned between the mark-in location and a final group frame associated with a group of frames that includes the mark-in location, each decoded frame having an associated first format;
    re-encoding each of the decoded frames into an associated second format, wherein the re-encoded second format of at least one of the decoded frames is different than its associated first format;

storing the re-encoded frames; and creating a copied segment that includes the re-encoded frames.

14. A method for copying a segment from a video file as recited in claim 13, wherein the group of frames further includes an initial group frame that is an I frame, and the final group frame is a frame before the next I frame in time.

15. A method for copying a segment from a video file as recited in claim 13, further comprising the step of selecting a mark-out location in the video file, the mark-out location defining the end of the copied segment.

16. A method for copying a segment from a video file as recited in claim 13, wherein the copying step is performed in response to a copy request in an edit list provided by an application requesting that a segment be copied from the video file.

17. A method for copying a segment from a video file as recited in claim 13, further comprising the step of:

creating a copy operator in response to a copy request; and creating control objects configured to perform the decoding and re-encoding steps to generate the re-encoded frames.

18. A method for copying a segment from a video file as recited in claim 17, wherein the control objects are created by the copy operator.

19. A method for copying a segment from a video file as recited in claim 18, wherein the control objects include a decoder, an encoder, a seeking engine, and a streamer for streaming an un-processed middle-glue segment from the video file.

20. A method for copying a segment from a video file as recited in claim 19, wherein the seek engine is responsible for identifying a particular frame within the video file.

21. A method for copying a segment from a video file as recited in claim 20, wherein the streamer is responsible for retrieving an un-processed middle-glue segment from the video file.

22. A method for copying a segment from a video file as recited in claim 19, wherein the control objects further include a demultiplexer, and a glue object for managing the re-encoded frames.

23. A method for copying a segment from a video file as recited in claim 22, wherein the re-encoded frames are stored as one of an in-glue file and an out-glue file.

24. A method for copying a segment from a video file as recited in claim 23, wherein the in-glue file contains re-encoded frames beginning with the mark-in frame and extending to one frame before the next I frame from the mark-in frame.

25. A method for copying a segment from a video file as recited in claim 23, wherein the out-glue file contains re-encoded frames beginning with a next frame after the most previous I frame from a mark-out frame, and extending to the mark-out frame.

26. A method for copying a segment from a video file as recited in claim 13, further including a middle-in location beginning at a first I frame after the final group frame, the middle-in frame defining the first frame in a middle-glue segment that is un-processed.

27. A method for copying a segment from a video file as recited in claim 26, further including a middle-out location identified as one frame prior to a most previous I frame from the mark-out location, the frames beginning with the middle-in location and ending at the middle-out location defining a middle-glue segment.

28. A method for copying a segment from a video file as recited in claim 13, wherein the associated second format includes re-encoded frame sequences of I frames, I and P frames, and I, P and B frames.

29. An apparatus for copying a segment from a video file having a multiplicity of video frames, wherein at least some of the frames are encoded as predicted frames, the method comprising the steps of:

selecting means for selecting a mark-in location in the video file, the mark-in location defining the beginning of the copied segment;

decoding means for decoding each of the frames positioned between the mark-in location and a final group frame associated with a group of frames that includes the mark-in location, each decoded frame having an associated first format;

re-encoding means for re-encoding each of the decoded frames into an associated second format, wherein the re-encoded second format of at least one of the decoded frames is different than its associated first format;

a storage medium for storing the re-encoded frames; and whereby a copied segment that includes the re-encoded frames is generated.

30. A computer readable media containing program instructions for clipping a segment from a video file having a multiplicity of video frames, wherein at least some of the frames are encoded as predicted frames, said computer readable media comprising:

program instructions for selecting a mark-in location in the video file, the markin location defining the beginning of the clipped segment;

program instructions for selecting a mark-out location in the video file, the mark-out location defining the end of the clipped segment;

program instructions for decoding a first frame associated with one of the mark-in location and the mark-out location, the first frame being a predictive frame having an associated first format;

program instructions for re-encoding the decoded first frame into a second format;

program instructions for storing the re-encoded first frame; and program instructions for creating a clipped segment that includes the re-encoded first frame.

* * * * *